US012531796B2

(12) United States Patent
Minnoni et al.

(10) Patent No.: US 12,531,796 B2
(45) Date of Patent: Jan. 20, 2026

(54) 911 OUTAGE DETECTION AND NOTIFICATION SYSTEM FOR A PUBLIC SAFETY ANSWERING POINT (PSAP)

(71) Applicant: RAPIDSOS, INC., New York, NY (US)

(72) Inventors: Martin Andres Minnoni, Buenos Aires (AR); Maximiliano Camporino, Buenos Aires (AR); Jamison Peevyhouse, Martin, TN (US)

(73) Assignee: RAPIDSOS, INC., New York, NY (US)

( * ) Notice: Subject to any disclaimer, the term of this patent is extended or adjusted under 35 U.S.C. 154(b) by 85 days.

(21) Appl. No.: 18/649,704

(22) Filed: Apr. 29, 2024

(65) Prior Publication Data

US 2025/0337665 A1    Oct. 30, 2025

(51) Int. Cl.
*H04L 43/06* (2022.01)
*H04L 43/04* (2022.01)
*H04W 4/90* (2018.01)

(52) U.S. Cl.
CPC .............. *H04L 43/06* (2013.01); *H04L 43/04* (2013.01); *H04W 4/90* (2018.02)

(58) Field of Classification Search
None
See application file for complete search history.

(56) References Cited

U.S. PATENT DOCUMENTS

| | | | |
|---|---|---|---|
| 2021/0065533 A1* | 3/2021 | Schuler | G08B 25/006 |
| 2025/0063633 A1* | 2/2025 | Tirana | H04W 4/14 |
| 2025/0247468 A1* | 7/2025 | Fucci | H04M 11/04 |
| 2025/0267441 A1* | 8/2025 | Eisner | H04W 4/90 |

* cited by examiner

*Primary Examiner* — June Sison
(74) *Attorney, Agent, or Firm* — Cygan Law Offices PC; Joseph T. Cygan

(57) ABSTRACT

An emergency management system (EMS) generates a likelihood of a 911 service outage for a public safety access point (PSAP). The EMS receives supplemental call data for mobile devices that initiated 911 calls to a public safety answering point (PSAP). The EMS generates a 911 call volume metric for the 911 calls. The EMS receives a number of queries from the PSAP for a portion of the supplemental call data that corresponds to the 911 call volume metric. The EMS tracks the number of queries received from the PSAP. The EMS determines the likelihood of a 911 service outage for the PSAP based on the 911 call volume metric and the number of queries received. The EMS notifies the PSAP of the likelihood of the 911 service outage (e.g., with an outage score).

24 Claims, 19 Drawing Sheets

911 OUTAGE DETECTION AND NOTIFICATION SYSTEM FOR A PUBLIC SAFETY ANSWERING POINT (PSAP)

TECHNICAL FIELD

This disclosure relates generally to emergency call center systems, and in particular to detecting 911 service outages.

BACKGROUND

One type of public emergency services agency is a 911 call center. A 911 call center staffs telecommunicators to answer 911 calls and dispatch emergency responders. When a mobile device calls 911, the calls are first received by cell towers and by mobile switching centers. The mobile switching centers provide the calls to a Selective Router or 9-1-1 Tandem, which uses the callers' estimated location to route the call to the geographically appropriate 911 call center. The Selective Router or 9-1-1 Tandem is part of the 911 service that can experience service outages. When 911 services go down, neither the public nor the 911 call center are made aware of the outage, which can become a fear-inducing experience for callers and an immense frustration for 911 call centers.

BRIEF DESCRIPTION OF THE DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

Figure 1A:
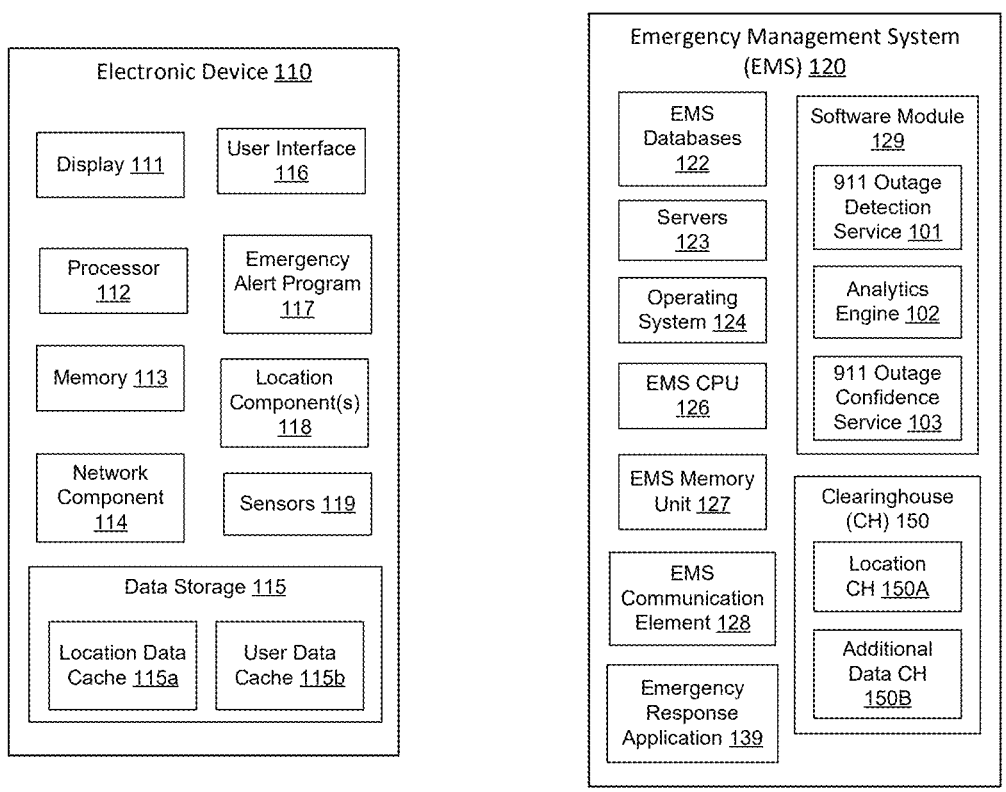
FIG. 1A illustrates diagrams of an electronic device and an emergency management system (EMS), in accordance with embodiments of the disclosure.

Various aspects of the disclosure include systems, devices, media, algorithms, and methods for providing outage detection of 911 service at an emergency communications center (ECC). In the following description, numerous specific details are set forth to provide a thorough understanding of the embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

A public emergency services agency may be established to provide a variety of services. A public emergency services agency can include a 911 call center, a railway call center, a primary call center, a secondary call center (e.g., that receives calls from or routes calls to a primary call center), and the like. A public emergency services agency may be referred to as an emergency service provider (ESP) or an emergency communications center (ECC). One type of ESP or ECC is a public safety answering point (PSAP). A PSAP is another name for a 911 call center that receives emergency calls and dispatches emergency responders in response to the emergency (e.g., 911) calls.

Multiple portions of a data pathway can contribute to a 911 service outage. When a 911 call is placed from a mobile device, the call is routed to cell towers, to mobile switching centers (MSCs), to a Selective Router (housed at a central office) and/or its functional equivalent, and then to a PSAP through various local networks. While the Selective Router may be the cause of a 911 service outage, typically the source of the outage is the hardware or software components of the local networks between the Selective Router and the PSAP. For example, one or more of fiber optics, switches, routers, servers, and/or databases of local networks can contribute to a 911 service outage. Regardless of the cause, when 911 services go down, neither the public nor the 911 call center are made aware of the outage, and the outage can become a fear-inducing and life-threatening experience for callers and an immense frustration for 911 call centers.

In accordance with aspects of the disclosure, an emergency management system (EMS) provides a 911 outage detection and notification service that is configured to determine a likelihood of a 911 service outage, adjust the likelihood based on one or more external sources, and provide various types of notification to personnel associated with a PSAP or other ECC. Advantageously, the disclosed 911 outage detection services may provide insights into the frequency, duration, and impact (e.g., number of missed calls) of 911 service outages. These insights may be used by local and state directors to better manage PSAP operations, select telecommunications partners/vendors, prepare emergency responders for a backlog of calls, or otherwise prepare PSAPs and emergency responders to seek other sources for communicating/detecting emergent/emergency events.

An EMS is configured to operate as a 911 outage detection and notification system, in accordance with aspects of the disclosure. The EMS may determine the likelihood of a 911 service outage using 911 call metrics and location query metrics. The 911 call metrics may be generated from supplemental call data that is received from mobile devices that initiate 911 calls. The supplemental call data may be received from mobile devices through one or more third-party servers (e.g., cell phone manufacturers, mobile OS developers, telecommunications companies, etc.). The 911 call metrics may include, but are not limited to, 911 call volume, 911 redial volume, 911 call duration, rates of change for the metrics, averages for the metrics, and comparisons (e.g., percentages over/under) to baseline data trends. Location query metrics may include, but are not limited to, query volume, query volume rates, query volume averages, and/or query volume comparisons to baseline data trends. A location query refers to a PSAP requesting device-based location data (e.g., GPS location included in supplemental call data) from the EMS in response to the PSAP receiving primary call data from a mobile device through a 911 service system.

The EMS determines and modifies the likelihood of a 911 service outage based on query volume, call volume, redial volume, and/or call duration, in accordance with aspects of the disclosure. If the EMS has a record (e.g., in supplemental call data) of several 911 calls from mobile devices and the PSAP fails to make location queries for the particular mobile devices, then this is an anomalous data that can be an indication of a 911 service outage. According to one embodiment, the EMS increases the likelihood of a 911 service outage when the query volume drops to zero for a period of time (e.g., more than a few seconds or minutes). According to one embodiment, the EMS increases the likelihood of a 911 service outage when the query volume drops to zero for a period of time as compared to a baseline query volume for a particular PSAP. According to one embodiment, the EMS increases the likelihood of a 911 service outage when call volume increases significantly (spikes) or increases significantly as compared to baseline call volume. According to one embodiment, the EMS increases the likelihood of a 911 service outage when redial volume increases significantly (spikes) or increases significantly as compared to baseline redial volume. According to one embodiment, the EMS increases the likelihood of a 911 service outage when call duration decreases significantly (trough) or decreases significantly as compared to baseline call duration (e.g., average).

The Inventors of the present disclosure have discovered that each of query volume, call volume, redial volume, and call duration may provide indication of a likelihood of a 911 service outage for a PSAP. The Inventors further discovered that the likelihood of a 911 service outage significantly increases (e.g., is more likely than not) when two or more of these call metrics experience anomalous data patterns. The Inventors discovered that the likelihood of a 911 service outage is quite high when all four metrics exhibit anomalous data patterns, in accordance with aspects of the disclosure.

In accordance with aspects of the disclosure, the EMS is configured to use external sources to validate the likelihood of a 911 service outage. The EMS may include 911 outage confidence system that provides a 911 outage confidence service. The 911 outage confidence service may search social media feeds, news feeds, weather feeds, traffic feeds, and/or telecommunications service providers' feeds in search of information that confirms or undermines the possibility of a 911 service outage, according to an embodiment.

In accordance with aspects of the disclosure, the EMS is configured to provide notifications of an outage score or of another indication of the likelihood of a 911 service outage for one or more PSAPs. The EMS may email or text a service outage alert to a PSAP director, to other (e.g., geographically adjacent) PSAPs, state-level directors of PSAPs, regional administrators of PSAPs, or the like. The EMS may provide (e.g., push) outage score data or another representation of a likelihood of a 911 service outage directly to a PSAP in an emergency response application that may be different than or integrated with the PSAPs CAD or mapping application. The EMS may also be configured to provide analytics for the call metrics and query metrics in addition to an outage score directly to a PSAP through, for example, the emergency response application.

Potential advantages of the disclosed 911 outage detection and notification system include greater state-wide and/or national evaluation of 911 outages, which may be used to preemptively deploy emergency responders to locations of incidents—with the understanding that people may be attempting 911 calls without getting through. Overall, embodiments of the disclosure improve the technology area of 911 service systems and emergency response systems by determining the operational up-time and effectiveness of existing systems. This information may be used to determine which 911 service system components to change and when to change them. Additionally, the up-time and effectiveness of 911 service systems may be used by PSAP administrators to choose more effective vendors of said services, for example. Furthermore, PSAP operators who are notified of a 911 service system outage may switch to radio-based communications and/or may initiate ham radio back up communications protocols that some communities have established to enable reporting and dispatch to those in need. The automated interview system prompts the caller with different questions that are based on previous responses. Various embodiments and described hereafter and represented in FIGS. 1A-16.

Electronic Device, EMS, and ESP

In various embodiments, disclosed herein are devices, systems, and methods for managing emergency data and/or alarm data for emergency response. FIG. 1A depicts exemplary diagrams of (i) an electronic device 110 and (ii) an emergency management system (EMS) 120 in accordance with one embodiment of the present invention. In some embodiments, the electronic device 110 is a digital processing device such as a communication device (e.g., mobile or cellular phone, computer, laptop, etc.). In some embodiments, the electronic device is a wearable device (e.g., a smartwatch). In some embodiments, the electronic device is an Internet of Things (IoT) device, such as a home assistant (e.g., an Amazon Echo) or a connected smoke detector (e.g., a Nest Protect smoke and carbon monoxide alarm). In some embodiments, the electronic device is a walkie-talkie or two-way radio.

In some embodiments, the electronic device 110 includes a display 111, a processor 112, a memory 113 (e.g., an EPROM memory, a RAM, or a solid-state memory), a network component 114 (e.g., an antenna and associated components, Wi-Fi adapters, Bluetooth adapters, etc.), a data storage 115, a user interface 116, an emergency alert program 117, one or more location components 118, and one or more sensors 119. In some embodiments, the processor 112 is implemented as one or more microprocessors, microcomputers, microcontrollers, digital signal processors, central processing units, state machines, logic circuitries, and/or devices that manipulate signals based on operational instructions. Among other capabilities, the processor 112 is configured to fetch and execute computer-readable instructions stored in the memory 113.

In some embodiments, the display 111 is part of the user interface 116 (e.g., a touchscreen is both a display and a user interface in that it provides an interface to receive user input or user interactions). In some embodiments, the user interface 116 includes physical buttons such as an on/off button or volume buttons. In some embodiments, the display 111 and/or the user interface 116 comprises a touchscreen (e.g., a capacitive touchscreen), which is capable of displaying information and receiving user input. In some embodiments, the communication device includes various accessories that allow for additional functionality. In some embodiments, these accessories (not shown) include one or more of the following: a microphone, a camera, speaker, a fingerprint scanner, health or environmental sensors, a USB or micro-USB port, a headphone jack, a card reader, a SIM card slot, or any combination thereof. In some embodiments, the one or more sensors include, but are not limited to: a gyroscope, an accelerometer, a thermometer, a heart rate sensor, a barometer, or a hematology analyzer. In some embodiments, the data storage 115 includes a location data cache 115A and a user data cache 115B. In some embodiments, the location data cache 115A is configured to store locations generated by the one or more location components 118.

In some embodiments, the emergency alert program 117 is an emergency response application or emergency response mobile application. In some embodiments, the emergency alert program 117 is configured to record user data, such as a name, address, or medical data of a user associated with the electronic device 110. In some embodiments, the emergency alert program 117 is configured to detect when an emergency request is generated or sent by the electronic device 110 (e.g., when a user uses the electronic device 110 to make an emergency call). In some embodiments, in response to detecting an emergency request generated or sent by the electronic device 110, the emergency alert program 117 is configured to deliver a notification to the EMS 120. In some embodiments, the notification is an HTTP post containing information regarding the emergency request. In some embodiments, the notification includes a location (e.g., a device-based hybrid location) generated by or for the electronic device 110. In some embodiments, in response to detecting an emergency request generated or sent by the electronic device 110, the emergency alert program 117 is configured to deliver user data to the EMS 120.

In some embodiments, as depicted in FIG. 1A, the emergency management system (EMS) 120 includes an EMS operating system 124, an EMS CPU 126, an EMS memory unit 127, an EMS communication element 128, and one or more software modules 129. In some embodiments, the EMS CPU 126 is implemented as one or more microprocessors, microcomputers, microcontrollers, digital signal processors, central processing units, state machines, logic circuitries, and/or devices that manipulate signals based on operational instructions. Among other capabilities, the EMS CPU 126 is configured to fetch and execute computer-readable instructions stored in the EMS memory unit 127. The EMS memory unit 127 optionally includes any computer-readable medium known in the art including, for example, volatile memory, such as static random-access memory (SRAM) and dynamic random-access memory (DRAM), and/or non-volatile memory, such as read-only memory (ROM), erasable programmable ROM, flash memories, hard disks, optical disks, and magnetic tapes. The EMS memory unit 127 optionally includes modules, routines, programs, objects, components, data structures, etc., which perform particular tasks (e.g., processes) or implement particular abstract data types.

The one or more software modules 129 may include a 911 outage detection service 101, an analytics engine 102, and a 911 outage confidence services that is configured to detect and notify personnel of a likelihood of a 911 service outage for one or more PSAPs, in accordance with aspects of the disclosure. 911 outage detection service 101, analytics engine 102, and 911 outage confidence services may be stored as modules having instructions that may be executed by EMS CPU 126 and servers 123, for example.

In some embodiments, the EMS 120 includes one or more EMS databases 122, one or more servers 123, and a clearinghouse 150. In some embodiments, the clearinghouse 150 is an input/output (I/O) interface configured to manage communications and data transfers to and from the EMS 120 and external systems and devices. In some embodiments, the clearinghouse 150 includes a variety of software and hardware interfaces, for example, a web interface, a graphical user interface (GUI), and the like. The clearinghouse 150 optionally enables the EMS 120 to communicate with other computing devices, such as web servers and external data servers (not shown). In some embodiments, the clearinghouse 150 facilitates multiple communications within a wide variety of networks and protocol types, including wired networks, for example, LAN, cable, etc., and wireless networks, such as WLAN, cellular, or satellite. In some embodiments, the clearinghouse 150 includes one or more ports for connecting a number of devices to one another or to another server. In some embodiments, the clearinghouse 150 includes one or more sub-clearinghouses, such as location clearinghouse 150A and additional data clearinghouse 150B, configured to manage the transfer of locations and additional data, respectively. In some embodiments, the EMS 120 additionally includes a user information module that receives and stores user information (e.g., personal information, demographic information, medical information, location information, etc.) within the EMS 120. In some embodiments, users can submit user information through a website, web application, or mobile application, such as during a registration process for an emergency response application. In some embodiments, when the EMS 120 receives emergency data including user information, such as through an emergency alert received by the clearinghouse 150 (as described below), the EMS 120 stores the user information in the user information module. In some embodiments, user information stored within the user information module is received by the EMS 120 from a third-party server system, as described below. In some embodiments, user information stored within the user information module is associated with an identifier of a user or an electronic device associated with a user, such as a phone number or an email address.

Figure 1B:
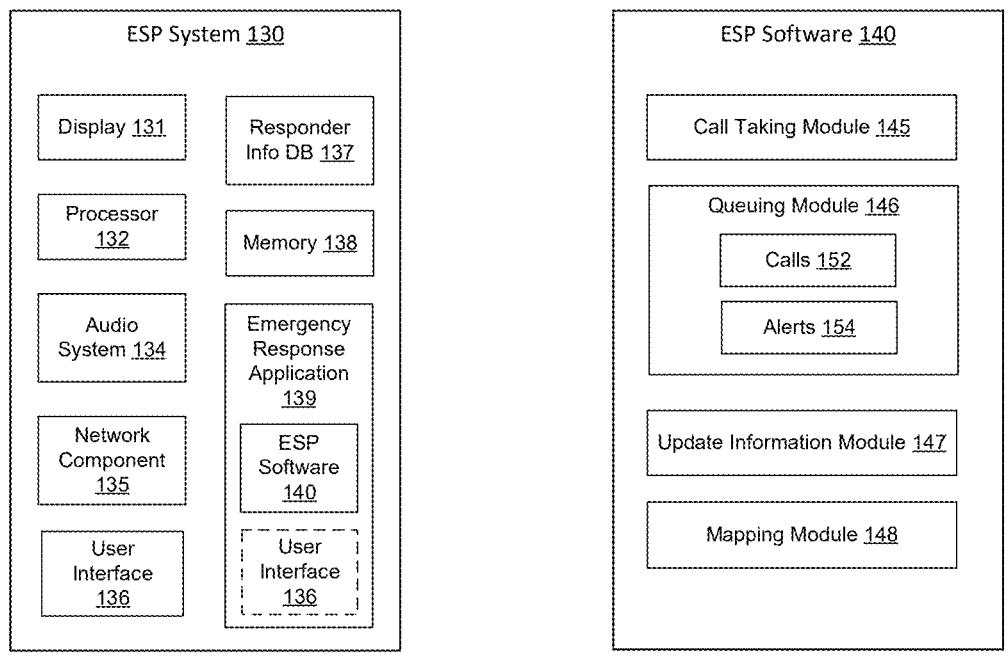
FIG. 1B illustrates diagrams of an emergency service provider (ESP) system and ESP software, in accordance with embodiments of the disclosure.

In some embodiments, as depicted in FIG. 1B, an emergency service provider (ESP; e.g., a public safety answering point (PSAP)) system 130 includes one or more of a display 131, a user interface 136, at least one central processing unit or processor 132, a network component 135, an audio system 134 (e.g., microphone, speaker and/or a call-taking headset), and a computer program implemented as an emergency response application 139 that may operate as a PSAP Emergency Display Application or Location Display Program. In some embodiments, the emergency response application 139 comprises one or more software modules 140. In some embodiments, the ESP system 130 comprises a database of emergency responders 137, such as medical assets, police assets, fire response assets, rescue assets, safety assets, etc.

In some embodiments, as depicted in FIG. 1B, the emergency response application 139 installed on ESP system 130 comprises ESP software 140. ESP software 140 may include a call taking module 145, a queuing module 146, an update information module 147, a mapping module 148, or a combination thereof. Call taking module 145 may integrate VOIP or a call receiving system with user interface 136 to enable a telecommunicator to see, receive, forward, hold, and terminate calls received at a PSAP or other ECC. Queuing module 146 may provide a visual list of calls 152 that have been received and/or handled and may provide a visual list of alerts 154 that have been received and/or handled. Update information module 147 may query one or more services and/or databases to update calls 152, alerts 154, and/or location data in the user interface 136. The user interface 136 may be part of the emergency response application 139. In some embodiments, the emergency response application 139 displays the information on a map (e.g., on the display 131), which may be updated with mapping module 148. In some embodiments, location and supplemental information (e.g., supplemental call data) is displayed for emergency service providers (e.g., police, fire, medical, etc.) and/or responders on their devices. In some embodiments, the responder device program displays the emergency location on a map.

Emergency Clearinghouse

In some embodiments, as mentioned above with respect to FIG. 1A, the emergency management system (EMS) 120 includes a clearinghouse 150 (also referred to as an "Emergency Clearinghouse") for storing, retrieving, and transmitting emergency data. In some embodiments, the clearinghouse 150 includes a location clearinghouse 150A and an additional data clearinghouse 150B. In some embodiments, the location clearinghouse 150A includes a location ingestion module and a location retrieval module, as described below with respect to FIG. 2. In some embodiments, the additional data clearinghouse 150B includes an additional data ingestion module and an additional data retrieval module, as described below with respect to FIG. 2. In other embodiments, additional data and location data (hereinafter "emergency data") are stored in one or more databases in a distributed manner. In some embodiments, the emergency data is stored in an external or third-party server that is accessible to the EMS 120. The clearinghouse 150 optionally functions as an interface that receives and stores emergency data from electronic or communication devices that are then retrieved, transmitted, and/or distributed to recipients (e.g., emergency service providers) before, during, or after emergencies. As described above, the clearinghouse optionally receives emergency data from electronic or communication devices such as mobile phones, wearable devices, laptop or desktop computers, personal assistants, intelligent vehicle systems, home security systems, IoT devices, camera feeds, and other sources (e.g., emergency response assets and asset service providers, as described in further detail below). As described above and below, emergency data optionally includes locations or additional data such as medical history, personal information, or contact information. In some embodiments, during an emergency, the clearinghouse 150 detects the emergency and/or otherwise identifies the need to provide emergency data pertaining to the emergency. The clearinghouse 150 then identifies any emergency data pertaining to the emergency stored within the clearinghouse 150 and transmits the pertinent emergency data to the requesting ESP. Accordingly, in some embodiments, the clearinghouse 150 acts as a data pipeline that automatically pushes emergency data to an ESP (e.g., to the emergency response application 139) that might otherwise be without access to emergency data that is critical to most effectively and efficiently responding to an emergency. Accordingly, location data stored within the clearinghouse 150 allows emergency responders to arrive at the scene of an emergency faster, and additional data stored within the clearinghouse 150 allows emergency responders to be better prepared for the emergencies they face.

For example, in one embodiment, an emergency alert is triggered by an electronic device 110 (e.g., by pressing a soft button, a physical button, voice command, or gesture) or autonomously based on sensor data (e.g., smoke alarms). In this example, the user then confirms the emergency and/or provides authorization for sending the emergency alert. Emergency data, such as an enhanced location and additional data regarding the user (e.g., the user's medical history) is delivered by the electronic device 110 to the EMS 120 and stored in the clearinghouse 150 (e.g., in the location clearinghouse 150A and the additional data clearinghouse 150B). In some embodiments, the EMS 120 or clearinghouse 150 formats the emergency data into a format that is compatible with industry standards for storing and sharing emergency data. For example, in some embodiments, the emergency data is formatted to be compatible with National Emergency Number Association (NENA) standards. In some embodiments, the clearinghouse 150 transmits the emergency data to a receiving party in response to receiving a query from the receiving party, as described below. In some embodiments, the clearinghouse 150 automatically pushes the emergency data to a receiving party (e.g., without receiving a query from the receiving party), such as a PSAP (e.g., ESP system 130). For example, in some embodiments, the clearinghouse 150 or emergency management system 120 housing the clearinghouse automatically pushes the emergency data to a receiving party using a subscription system, as described below.

In some embodiments, as mentioned above, a requesting party (such as a PSAP responding to an emergency call) queries the clearinghouse 150 with an emergency data request (such as a HTTP GET request). In some embodiments, the emergency data request is in the form of the Location Information Server (LIS) protocol. In response to the emergency data request, the EMS 120 or clearinghouse 150 sends an appropriate response including relevant emergency data to the requesting party via an encrypted pathway. In some embodiments, the emergency data request is in the form of HTTP-Enabled Location Delivery (HELD) and the response from the EMS 120 or clearinghouse 150 is in the form of Presence Information Data Format Location Object (PIDF-LO). In some embodiments, the emergency data request includes an authorization code (also referred to as an "authorization token" or "temporary access token") in the body, header, or metadata of the request, and the EMS 120 checks that the authorization code is active before providing a response to the requesting party. In some embodiments, authorization is provided in the "Authorization" header of the emergency data request using HTTP Basic Authentication. For example, in some embodiments, authorization is base64-encoded username and password for an account associated with the requesting party. In some embodiments, emergency data requests are sent over public networks using API access keys or credentials. In some embodiments, Transport Layer Security (TLS) is used in the requests and responses from the EMS 120 for encryption security. In some embodiments, the call taking module 145 includes a call-handling application, which may be provided by a third-party vendor. In some embodiments, an ESP personnel interacts with the call-handling application to send an emergency data request to the EMS 120. In some embodiments, the response from the EMS 120 is displayed at the ESP display 131.

In some embodiments, as described above, emergency data includes locations and additional data. In some embodiments, emergency data includes one or more emergency data categories (also referred to as "data categories"). In some embodiments, the emergency data categories include: service data reference, full name, email, emergency contacts, addresses, language, occupation, phone numbers, websites, gender, height, weight, ethnicity, profile picture, allergies, medical conditions, medications, disabilities, blood type, medical notes, birthday, and additional comments. In some embodiments, emergency data categories are tagged with tags for specific types of data such as "demographics" or "medical data." For example, in some embodiments, gender, height, weight, ethnicity, profile picture (image-url) are tagged as demographic data. In some embodiments, medical data protected under HIPAA and other laws are tagged as "HIPAA" or "private." In some embodiments, medical data includes information on one or more of allergies, medical condition(s) or illness(es), medication(s), disabilities, blood type, medical note(s), and other medical information. In some embodiments, medical information protected under HIPAA are encrypted and/or anonymized. In some embodiments, some data are tagged as "general" or another similar tag, wherein access is not specifically restricted.

An example of an additional data communication from the EMS 120 in a standard format compatible with industry standards, PIDF-LO, is shown below.

HTTP/1.1 200 OK
Date: Tue, 1 Dec. 2016 23:27:30 GMT
Content-Length: 489
Content-Type: application/EmergencyCallData.DeviceInfo+xml
<dev:EmergencyCallData.DeviceInfo
xmlns:dev="urn:ietf:params:xml:ns:EmergencyCallData:DeviceInfo">
<dev:DataProviderReference>
d4b3072df.201409182208075@example.org In some embodiments, when the emergency data is stored at a third-party server and receives a request for emergency data from the EMS 120, as a database query, the third-party server formats the requested emergency data and stores this information in an alternate database, and forwards either a response or a reference to the alternate database for accessing the emergency data requested by the EMS 120, which is provided to the ESP 130 over a hybrid analog and/or a data communication channel, depending on the capabilities of ESP 130. In some embodiments, the third-party server stores the emergency data, requested by the EMS 120 or directly by the ESP 130, in the alternate database for a certain period of time after receiving the request for the emergency data regarding a user and any electronic devices 110. In some embodiments, this period of time is a timer value (e.g., a timer countdown or a set time point) defined by the EMS 120 and the third-party server in conjunction with each other prior to the addition of the requested emergency data to the alternate database at the third-party server. In some embodiments, once the timer value has passed and no new requests for the emergency data pertaining to the particular user and the electronic device 110, or other devices associated with the user, are received by the third-party server, then the third-party server marks the particular alternate database entries to be deleted and waits for another, different, time-out interval. In some embodiments, once this particular second time-out interval has also been completed and no new requests for location data for the particular user or associated electronic devices 110 are received by the third-party server, the third-party server removes the specific marked entries from the alternate database in the next cycle of updates for the alternate database. In some embodiments, after adding the emergency data in the alternate database by the third-party server, the third-party server keeps updating the emergency data in the alternate database on a periodic, or as-needed basis, for the purpose of keeping the emergency data about the user or electronic device 110 current for providing the most recent and accurate emergency data to the EMS 120 and the ESP 130 for the purposes of responding to a request for emergency assistance. In some embodiments, the third-party server is updated by the EMS 120 for all the emergency data pertaining to all users and their associated electronic devices 110 that are served by the EMS 120 at any current time.

In some non-emergency situations, there is a need to access location data, user data, emergency data or sensor data. For example, in some embodiments, a user of an electronic device 110 grants authorization to family members to access location data for the user. Accordingly, when a family member requests location data for a user, access is granted if there is proper authorization. As another example, in some embodiments, a taxi operations company requests and obtains location data of one or more fleet members to keep track of its vehicles (e.g., via onboard vehicle console or terminal).

Various embodiments and applications of the clearinghouse 150 are described in detail herein. However, the embodiments and applications described herein should not be considered exhaustive or limiting in any way.

Figure 1C:
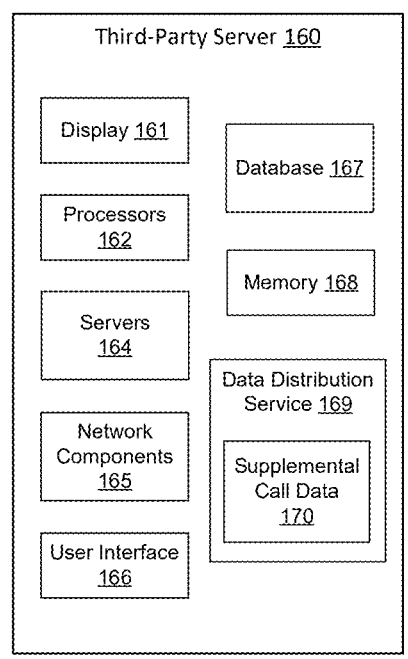
FIG. 1C illustrates a diagram of a third-party server, in accordance with embodiments of the disclosure.

In some embodiments, as depicted in FIG. 1C, a third-party server 160 includes one or more of a display 161, a user interface 166, at least one central processing unit or processors 162, network components 165, servers 164, and a computer program implemented as a data distribution service 169. In some embodiments, the data distribution service 169 collects, receives, and selectively (e.g., based on geo-fence policies) distributes supplemental call data 170. In some embodiments, the third-party server 160 comprises a database 167 for geographic permissions for distributing supplemental call data 170.

Figure 2:
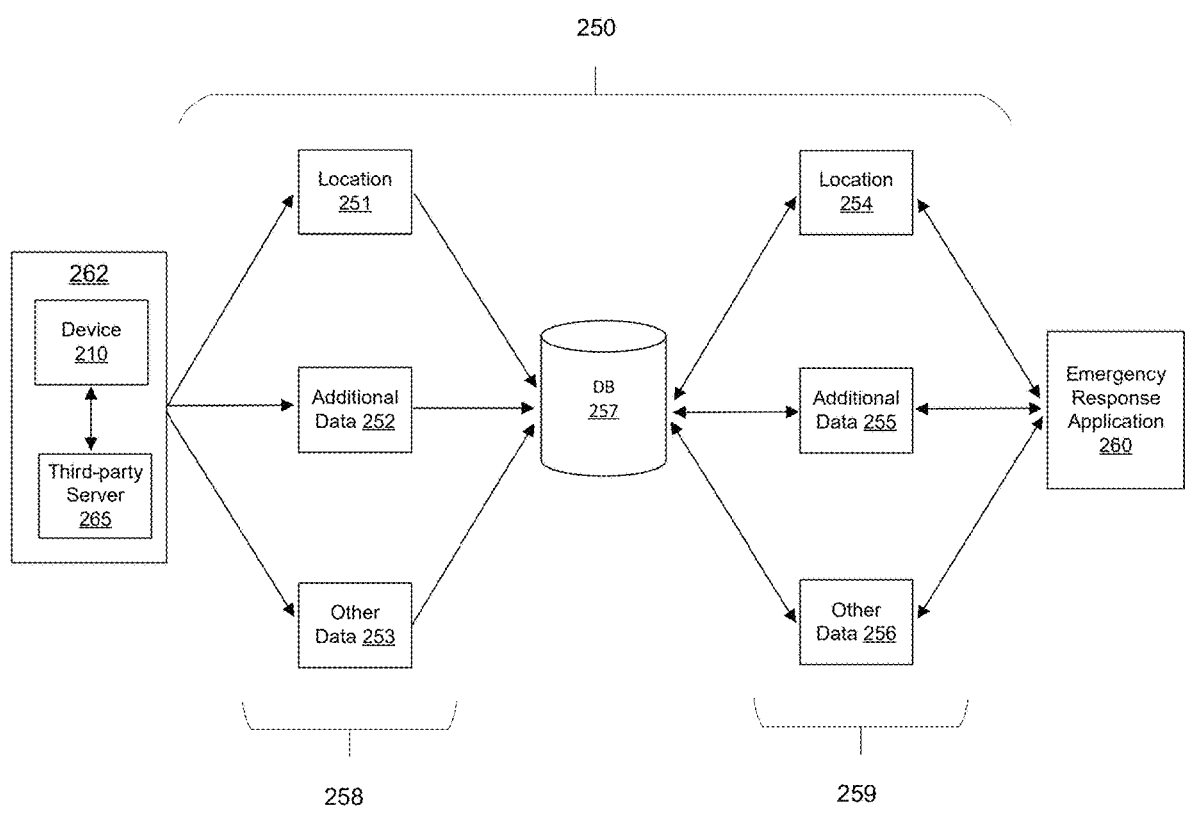
FIG. 2 illustrates a diagram of a clearinghouse that may be used by an EMS, in accordance with embodiments of the disclosure.

FIG. 2 depicts an embodiment of a clearinghouse 250 for storing and retrieving emergency data and/or alert/alarm data. In some embodiments, the clearinghouse 250 includes a set of ingestion modules 258 (also referred to as "ingestion modules") and a set of retrieval modules 259 (also referred to as "retrieval modules"). The set of ingestion modules 258 is configured to receive various forms of emergency data from various emergency data sources 262, such as an electronic device 210 or a third-party server 265. In some embodiments, an electronic device 210 is a communication device (e.g., a mobile phone), a wearable device (e.g., a smartwatch), or an internet of things (IoT) device (e.g., a smart speaker) that can communicate with one or more of the ingestion modules within the set of ingestion modules 258. In some embodiments, a third-party server 265 stores data that is not generated by or stored within an electronic device. For example, in some embodiments, third-party server 265 includes a database of static medical information that can be sent to the clearinghouse during an emergency. In some embodiments, when the EMS 120 detects an emergency (e.g., when a person calls 9-1-1), the clearinghouse 250 can query an emergency data source 262 for emergency data regarding the emergency. For example, in some embodiments, in response to detecting a 9-1-1 call made from a mobile phone, the additional data ingestion module 252 (as described below) sends a query including the phone number of the mobile phone to a third-party server 265 that stores static medical information. The third-party server 265 can then return any available medical information associated with the phone number of the mobile phone to the additional data ingestion module. In some embodiments, multiple ingestion modules within the set of ingestion modules can receive emergency data for a single emergency. For example, in some embodiments, when a person calls 9-1-1 from a mobile phone, the mobile phone can send a device-based hybrid location to the location ingestion module 251 and demographic data to the additional data ingestion module 252. In some embodiments, the clearinghouse 250 can receive emergency data from multiple emergency data sources 262 for a single emergency. For example, in some embodiments, when a person calls 9-1-1 from a mobile phone, the clearinghouse 250 can receive a location from the mobile phone (such as through the location ingestion module 251) and a heartrate from a smartwatch that the person is wearing (such as through additional data ingestion module 252). Or for example, in some embodiments, when a person calls 9-1-1 from a mobile phone, the clearinghouse 250 can receive a location from the mobile phone and medical information associated with the person from a third-party server 265.

The set of ingestion modules 258 optionally include a location ingestion module 251, an additional data ingestion module 252, and one or more other data ingestion modules 253. In some embodiments, the location ingestion module 251 is an emergency location service ingestion interface for posting or receiving emergency locations. In some embodiments, the location ingestion module 251 is a REST API that receives an HTTP POST including location data when an emergency alert is generated (e.g., when an emergency call is made from a cell phone). The location data includes a location generated concurrently or in response to the generation of the emergency alert. In some embodiments, the location data includes a location generated before the emergency alert. For example, when an emergency call is made from a cell phone, thereby generating an emergency alert, the location ingestion module 251 receives a location recently generated by the phone but before the emergency alert was generated, ensuring that a location for the emergency is available as quickly as possible. In some embodiments, the location data includes a device-based hybrid location generated by an electronic device 210 that generated the emergency alert. In some embodiments, the location data includes a location generated by a second electronic device communicatively coupled to the electronic device that generated the emergency alert. The location ingestion module 251 is integrated into an electronic device 210 through a mobile application installed on the device 210 or integrated into the firmware or operating system of the electronic device 210.

In some embodiments, the location data is generated by the electronic device 210 before the emergency and is accessible to a PSAP during an emergency. For example, a taxi company may have software that transmits the location of its cars or assets to the emergency clearinghouse 250 preemptively. Thus, when an emergency arises, the location of the affected taxi can be made accessible quicker to send help. In some embodiments, the location data is generated by the electronic device 210 after the emergency has commenced and is made accessible to a PSAP or central station during the on-going emergency or alarm-triggering event. For example, updated location data of a hijacked taxi is also periodically transmitted to the emergency clearinghouse 250 and made accessible to a PSAP and/or central station.

In some embodiments, the additional data ingestion module 252 is an interface for posting or receiving static or dynamic emergency profile data (hereinafter, "additional data" or "additional information"). In some embodiments, additional data comprises medical data, personal data, demographic data, health data, or any combination thereof. Examples of medical data include information relating to a person's medical history, such as past surgeries or preexisting conditions. Examples of personal data include a person's name, date of birth, height, weight, occupation, address(es) (e.g., home address, work address, etc.), spoken languages, and other personal information. Examples of demographic data include a person's gender, ethnicity, age, etc. Examples of health data include information such as a person's blood type or heartrate. In some embodiments, additional data comprises data received from connected devices such as vehicles, IoT devices, and wearable devices. For example, some intelligent vehicle systems generate and send data regarding a crash, such as the speed at which the vehicle was moving just before the collision, where the vehicle was struck, the number of occupants, etc. In some embodiments, the additional data ingestion module 252 is a REST API (e.g., a JSON (JavaScript Object Notation) REST API). For example, in some embodiments, when an emergency call is made from a cell phone, thereby generating an emergency alert, the cell phone receives a heartrate of the person who made the emergency call from a smartwatch worn by the person and communicatively coupled to the cell phone (e.g., Wi-Fi or Bluetooth connectivity). The cell phone sends the heartrate to the additional data ingestion module 252, along with any other additional data, in an HTTP POST. In some embodiments, the additional data ingestion module 252 is integrated into an electronic device 210 through a mobile application installed on the device 210 or integrated into the firmware or operating system of the electronic device 210. In some embodiments, additional data is sent to the additional data ingestion module 252 from a network server. The additional data ingestion module 252 is accessed by any connected platform that receives data that might be relevant in an emergency. Connected platforms optionally send additional data to the additional data ingestion module 252 at any time. For example, in some embodiments, a website, web application, or mobile application integrated with the additional data ingestion module 252 that allows users to create profiles sends additional data included in the profiles to the additional data ingestion module 252 every time a profile is created or updated.

In some embodiments, the set of ingestion modules 258 includes one or more other data ingestion modules 253. Another data ingestion module 253 is optionally an interface for posting or receiving data relevant to emergencies that is not received by the location ingestion module 251 or the additional data ingestion module 252. In some embodiments, the other data ingestion module 253 receives audio or video streams during an emergency from electronic or communication devices associated with the emergency or proximal to the emergency. For example, an emergency alert is generated by an intelligent vehicle system installed in a vehicle in response to the vehicle experiencing a collision. In this example, the emergency alert is sent to the EMS 120 by the intelligent vehicle system or by an electronic device communicatively coupled to the intelligent vehicle system, such as a cell phone coupled to the intelligent vehicle system via Bluetooth. In response to generating the emergency alert, the intelligent vehicle system additionally begins streaming audio and video from microphones and cameras installed inside or outside of the vehicle to the clearinghouse 250 through the other data ingestion module 253. A cell phone communicatively coupled to the intelligent vehicle system additionally or alternatively streams audio or video from microphones and cameras integrated into the cell phone to the clearinghouse 250 through the other data ingestion module 253. In some embodiments, the one or more other data ingestion modules 253 are REST APIs that are accessed with an HTTP POST.

After receiving the relevant data, the set of ingestion modules 258 can store the data in one or more clearinghouse databases 257. For example, in some embodiments, the clearinghouse databases 257 includes a location database and an additional data database. In some embodiments, as described above, the one or more clearinghouse databases 257 are stored on a third-party server communicatively coupled to or otherwise accessible by the EMS 120. In some embodiments, the set of ingestion modules 258 tags or otherwise associates the data received by the modules with an identifier of a user or device associated with the data. For example, the set of ingestions modules 258 tag the data the received by the modules with a user ID number, an email address, or a phone number (e.g., caller ID). In some embodiments, the ingestion modules 258 tag the data received by the clearinghouse 250 based on the data source (e.g., device name or type, application name, username, phone number, corporate account, etc.).

In some embodiments, the emergency data maintained by the clearinghouse is purged. In some embodiments, the data is purged on a regular or periodic basis. In some embodiments, data that is older than a defined threshold is purged. In some embodiments, different data types are purged according to different schedules and/or thresholds. For example, dynamic data (e.g., data that is subject to constant or regular change) such as location data may be more likely to become out-of-date over time and so may be purged more frequently than static data such as a permanent home address, which may remain permanently in the database until it is replaced with an updated address.

In some embodiments, an individual or group of individuals are associated with multiple identifiers. For example, the location ingestion module 251 receives a location generated by a phone associated with the phone number +1-555-555-5555, associated with John Doe. The additional data ingestion module 252 also receives a heartrate from a smartwatch associated with the email address johndoe@email.com, also associated with John Doe. In this example, the set of ingestion modules 258 tag the location with the phone number "+1-555-555-5555," tag the heartrate with the email address "johndoe@email.com," and associate both the location and the heartrate with John Doe in the clearinghouse databases 257.

In some embodiments, as depicted in FIG. 2, the clearinghouse 250 includes a set of retrieval modules 259. The set of retrieval modules 259 optionally include a location retrieval module 254, an additional data retrieval module 255, and one or more other data retrieval modules 256. In some embodiments, the location retrieval module 254 is an interface for retrieving location data from the clearinghouse databases 257. In some embodiments, the location retrieval module 254 is a JSON REST API that receives a query or request (e.g., in the form of an HTTP GET request) from a requesting party, such as an ESP. In some embodiments, the request is sent from a call-taking application (e.g., call taking module 145) integrated into the ESP system 130. In some embodiments, the request (also referred to as an "emergency data request") is sent from an emergency response application 260. In some embodiments, the location retrieval module 254 provides a single GET endpoint for retrieving either the latest or paginated list of locations for a specific caller ID (e.g., an identifier of a user or an electronic device associated with a user, such as a phone number). For example, as described above, a phone number associated with a device 210 from which a location was received is included in the header, body, or metadata of the request sent to the location retrieval module 254. The clearinghouse 250 then retrieves a location or set of locations from the clearinghouse databases 257 and deliver the location or set of locations to the requesting party. In some embodiments, the location retrieval module 254 is a location information server (LIS). In some embodiments, the LIS is a NG911 standards-based XML API for the retrieval of location data from the clearinghouse databases 257. In some embodiments, as described above, the location retrieval module 254 accepts HELD requests from requesting parties and returns location data for a specific caller ID or anonymous reference. However, in some embodiments, the location retrieval module 254 automatically retrieves and transmits location data using a subscription system, as described below.

As depicted in FIG. 2, the set of retrieval modules 259 optionally include an additional data retrieval module 255. In some embodiments, the additional data retrieval module 255 is a JSON REST API for the retrieval of emergency or additional data. As described above, additional data optionally includes medical data, personal data, demographic data, and health data. Additional data also optionally includes data received from connected devices such as vehicles, IoT devices, and wearable devices. In some embodiments, the additional data retrieval module 255 receives a query or request (e.g., in the form of an HTTP GET request) from a requesting party, such as an ESP. In some embodiments, the request (also referred to as an "emergency data request") is sent from an emergency response application 260. The additional data then retrieves additional data associated with a specific or particular identifier of a user or an electronic device associated with the user, such as a phone number, and returns the data to the requesting party. In some embodiments, the set of retrieval modules 259 further includes one or more other data retrieval modules 256, which function similarly to the location retrieval module 254 and additional data retrieval module 255, for the retrieval of data stored in the clearinghouse databases 257 not retrieved by the location retrieval module 254 or additional data retrieval module 255. However, in some embodiments, the additional data retrieval module 255 automatically retrieves and transmits additional data using a subscription system, as described below.

In some embodiments, a retrieval module within the set of retrieval modules 259 and a corresponding ingestion module within the set of ingestion modules 258 form a sub-clearinghouse. For example, in some embodiments, location ingestion module 251 and location retrieval module 254 combine to form location clearinghouse 150A (as shown in FIG. 1B). Likewise, in some embodiments, additional data ingestion module 252 and additional data retrieval module 255 combine to form additional data clearinghouse 150B. In some embodiments, a requesting party is only given access to a particular sub-clearinghouse. For example, a police officer is only given access to the location clearinghouse 150A, while an EMT (emergency medical technician) is only given access to the additional data clearinghouse 150B. However, a requesting party is given differential access to the clearinghouse 150, sub-clearinghouses, or particular emergency data categories within the clearinghouse 150 based on any factor or set of factors. In some embodiments, a requesting party initiates a query or request (i.e., an emergency data request) using an emergency response application 260 (as described below), which in turn generates the query and transmits the query to the clearinghouse 250.

In some embodiments, the clearinghouse 250 includes an emergency data streaming module or streaming module (not shown). In some embodiments, a streaming module is capable of both receiving and transmitting emergency data, but emergency data received by the streaming module is not stored within a database. Instead, emergency data is streamed through the streaming module without being committed to memory within the clearinghouse 250. In some embodiments, the streaming module establishes an active or persistent communication link (e.g., a WebSocket connection) between the EMS or clearinghouse 250 and an emergency data recipient. For example, in some embodiments in which emergency data is pushed from the EMS or clearinghouse 250 to an emergency data recipient, the streaming module can establish a persistent communication link between the EMS or clearinghouse 250 and the emergency data recipient, and any emergency data that is received by the EMS or clearinghouse 250 to which the emergency data recipient is subscribed is pushed to the emergency data recipient through the persistent communication link without being committed to memory within the EMS or clearinghouse 250.

As described above, in some embodiments, an emergency management system (EMS) maintains a clearinghouse 250 that obtains and shares emergency data to aid emergency service providers (ESPs) in responding to emergencies and to aid central stations in responding to various alerts that may or may not be emergencies. During an emergency, in some embodiments, an ESP can send an emergency data request to the EMS through the emergency response application 260, and, in response, the EMS can send any available emergency data associated with the emergency back to the emergency response application 260. In some embodiments, as described above, the emergency response application 260 includes an identifier associated with an emergency alert in the emergency data request. The EMS can then use the identifier associated with the emergency alert to retrieve emergency data associated with the emergency alert from the clearinghouse. For example, as described above, an ESP 230 (e.g., a public safety answering point (PSAP)) can receive an emergency alert in the form of a 9-1-1 phone call (representative of an emergency or potential emergency) from a mobile phone associated with a phone number (e.g., (555) 555-5555). The ESP 230 can then send an emergency data request including the phone number (i.e., the identifier of the emergency alert) to the EMS, which can then retrieve any emergency data within or otherwise accessible by the clearinghouse 250 associated with the phone number and return the available emergency data to the requesting ESP 230. This process of returning emergency data to the emergency response application 260 in response to an emergency data request is referred to as "pulling" emergency data from the clearinghouse.

However, in some embodiments, the EMS can "push" emergency data and/or alert data from the clearinghouse 250 to the emergency/alert response application (i.e., the EMS can send emergency data to the emergency response application 260 without receiving an emergency data request). In some embodiments, the EMS pushes emergency data to the emergency response application 260 using an emergency data subscription system. Using the emergency data subscription system, a recipient (or potential recipient) of emergency data from the clearinghouse 250 can subscribe to the clearinghouse 250 for a particular device identifier, user identifier, or ESP account (hereinafter, "subscription"). After subscribing to a subscription, the recipient (e.g., an ESP) may automatically receive updates regarding the subscription without first sending an emergency data request. For example, in some embodiments, if an ESP subscribes to a phone number, whenever the clearinghouse 250 receives updated emergency data associated with the phone number, the clearinghouse 250 can automatically send the updated emergency data associated with the phone number to the ESP (e.g., through the emergency response application 260), without first receiving an emergency data request including the phone number. For example, in some embodiments, if a recipient is subscribed to a particular phone number, and the clearinghouse 250 receives a new or updated location associated with the particular phone number, the clearinghouse 250 will instantly and automatically push the new or updated location associated with the particular phone number to the recipient the moment that the new or updated location is received by the clearinghouse 250, without the recipient having to send an emergency data request. In some embodiments, when an ESP or ESP personnel accesses the emergency response application 260 at a computing device associated with the ESP or ESP personnel, the EMS establishes a persistent or active communication link (e.g., a WebSocket connection) with the computing device in order to push emergency data regarding a subscription to which the ESP or ESP personnel is subscribed to the emergency response application 260.

In some embodiments, an active communication link is a connection, or a potential connection (e.g., two corresponding endpoints), between two entities (e.g., an EMS and an ESP) through which data can be freely transmitted (i.e., without a recipient entity having to actively accept transmitted data). In some embodiments, an active communication link is a persistent communication link. In some embodiments, a persistent communication link is a communication link that endures for a period of time that is not dependent on the transmission of a particular packet of data. For example, in some embodiments, a persistent communication link between two entities (e.g., an EMS and an ESP) endures until the communication link is actively terminated by one of the entities, as opposed to passively terminating once a particular packet of data (e.g., a particular emergency alert) has been transmitted. In another example, a persistent communication link endures for a predetermined amount of time (e.g., five minutes or an hour). In another example, a persistent communication link established between an EMS and an ESP through an emergency response application endures until a login session on the emergency response application is terminated or the emergency response application itself is terminated. In some embodiments, a persistent communication link is a WebSocket connection. WebSocket is a type of computer communications protocol. A WebSocket connection is a longstanding or persistent internet connection between a client and a server that allows for bidirectional communication between the client and server without the client needing to send data requests to the server, which differentiates the WebSocket computer communications protocol from other types of computer communications protocols such as the Hypertext Transfer Protocol (HTTP). The WebSocket protocol is often used by chat clients to facilitate user to user webchats. In some embodiments, the EMS establishes an active communication link with a computing device (e.g., an ESP console 130) in response to receiving an emergency data request. In some embodiments, the EMS establishes an active communication link with an ESP console when an ESP personnel logs into the emergency response application 260 at the ESP console. In some embodiments, the EMS establishes an active communication link with a responder device when an ESP personnel logs into the emergency response application 260 at the responder device. In some embodiments, an active communication link established between the EMS and a computing device associated with ESP personnel is maintained by the EMS for the duration of the ESP personnel's log-in session.

In some embodiments, the EMS automatically subscribes a recipient to a subscription (e.g., a particular device identifier or user identifier) in response to receiving an emergency data request including the subscription or an identifier of the subscription. For example, in some embodiments, when an ESP personnel sends an emergency data request including a phone number to the EMS through their ESP console (e.g., through the emergency response application 260), the EMS subscribes the ESP personnel to the phone number and establishes a persistent or active communication link with the ESP console. Then, whenever the clearinghouse 250 receives updated emergency data associated with the phone number, the EMS can automatically push the updated emergency data associated with the phone number to the ESP console. For example, an ESP personnel logs into an emergency response application 260 in communication with the EMS on the ESP personnel's ESP console. Subsequently, the ESP personnel receives a 9-1-1 call from a mobile phone and then generates and sends an emergency data request including the phone number of the mobile phone to the EMS through the emergency response application 260. The EMS then uses the phone number of the mobile phone to retrieve the most recent location associated with the mobile phone received by the clearinghouse and returns the most recent location associated with the mobile phone to the ESP personnel through the emergency response application 260. The EMS simultaneously subscribes the ESP personnel to the phone number of the mobile phone and establishes a WebSocket connection between the EMS and the ESP console and automatically pushes any updated emergency data (e.g., enhanced locations) associated with the phone number received by the clearinghouse to the emergency response application 260 as soon as the updated emergency data associated with the phone number is received by the clearinghouse 250.

In some embodiments, an ESP is associated with an identifier of the ESP (e.g., a unique ESP account ID; also referred to as an "ESP identifier") that an ESP or ESP personnel can subscribe to. The EMS can then establish a persistent or active communication link with a computing device associated with an ESP or ESP personnel subscribed to the unique ESP identifier and push emergency data associated with the unique ESP identifier to the computing device (e.g., through the emergency response application 260) whenever new or updated emergency data associated or tagged with the unique ESP identifier is received by the clearinghouse 250. For example, in some embodiments, when the clearinghouse 250 receives a location (e.g., an emergency location) associated with an emergency alert (e.g., when a person calls 9-1-1 from a mobile phone and the mobile phone responsively sends a current location of the mobile phone to the clearinghouse 250), the EMS retrieves one or more geofences (as described below) associated with each ESP registered with the EMS and determines which (if any) of the geofences that the location associated with the emergency alert falls within. The EMS then tags the location associated with the emergency alert with the unique ESP identifiers associated with each of the ESPs associated with geofences that the location associated with the emergency alert falls within. For example, if four ESPs are registered with the EMS—ESP A, ESP B, ESP C, and ESP D—and the clearinghouse 250 receives a location associated with an emergency that falls within the one or more of the geofences associated with ESP A and ESP D, the EMS can tag the location associated with the emergency alert with the unique ESP account ID associated with ESP A and the unique ESP account ID associated with ESP D. The EMS can then push the location associated with the emergency alert to any ESPs or ESP personnel with an established persistent or active communication link with the EMS and currently subscribed to either the unique ESP account ID for ESP A or the unique ESP account ID for ESP D. In some embodiments, when an ESP personnel logs into the emergency response application 260, a communication is sent to the EMS that includes one or more unique ESP account IDs that the ESP personnel or their respective ESP is currently subscribed to.

Emergency Response Environment

Figure 3A:
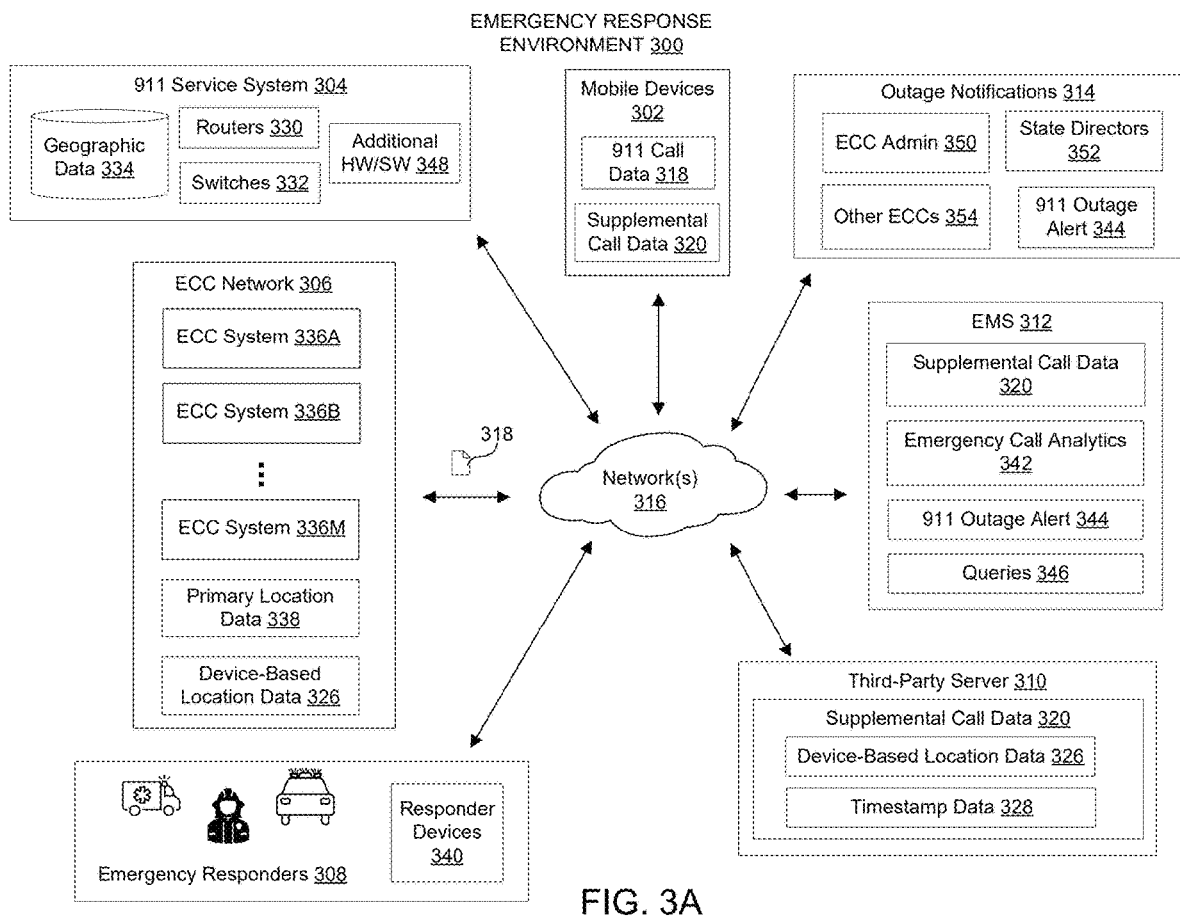
FIGS. 3A and 3B illustrate diagrams of emergency response environments, in accordance with embodiments of the disclosure.
Figure 3B:
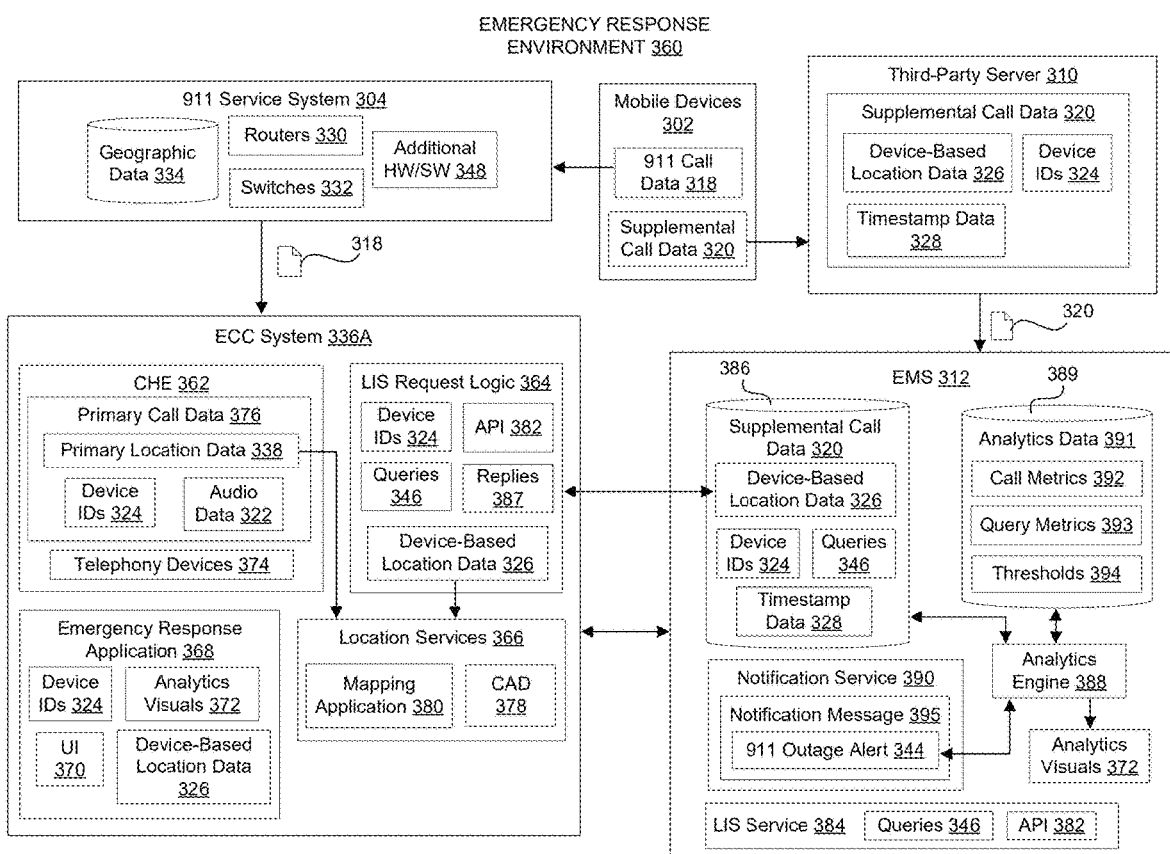

FIGS. 3A and 3B illustrate example diagrams of an emergency response environment and related components that are configured to detect a 911 service outage, generate a 911 outage alert, and provide outage notifications to relevant recipients, in accordance with aspects of the disclosure. FIG. 3A illustrates an emergency response environment 300, according to an embodiment. Emergency response environment 300 includes a number of components that allow emergency responders to be dispatched to a 911 call. Emergency response environment 300 is configured to detect a likelihood of 911 service outages at one or more PSAPs and provides outage notifications, in accordance with aspects of the disclosure. Emergency response environment 300 includes a mobile device 302, a 911 service system 304, an ECC network 306, emergency responders 308, a third-party server 310, an emergency management system (EMS) 312, and outage notifications 314 all communicatively coupled through one or more networks 316 (e.g., wired, wireless, Internet, intranet, Bluetooth, Wi-Fi, etc.), in accordance with aspects of the disclosure.

Mobile devices 302 may provide multiple types of data after initiating a 911 call. For example, when one or more mobile devices 302 make a 911 call, 911 call data 318 and supplemental call data 320 may be provided to a telecommunications or cell phone tower during the call(s). 911 call data 318 may include audio data 322 and may include device identifiers (IDs) 324. Supplemental call data 320 may also include the device IDs 324 but may additionally include a device-based location data 326 (e.g., from a global positioning satellite (GPS), nearby Wi-Fi, other nearby devices, other satellites, etc.) and timestamp data 328, according to an embodiment. From cell phone tower networks and/or mobile switching center (MSC), 911 call data 318 may be routed to a 911 service system 304, and supplemental call data 320 may be routed to third-party server 310.

911 service system 304 may include routers 330, switches 332, and geographic data 334 that may be stored in one or more data structures. Geographic data 334 may be queried and requested from one or more databases (e.g., LIS databases) that are external to 911 service system 304. 911 service system 304 is configured to receive 911 call data 318, determine which ECC of ECC Network 306 to route the call data to, and forward 911 call data 318 to the geographically relevant ECC.

Third party server 310 represents a cloud-based system of a telecommunications company associated with mobile devices 302, according to an embodiment. Third-party server 310 may represent a manufacturer of mobile devices 302, may represent an operating system developer for mobile devices 302, may represent an original equipment manufacturer (OEM) for mobile devices 302, and/or may represent a telecommunications service provider that mobile devices 302 use or are subscribed to, according to embodiments of the disclosure. Third-party server 310 may receive supplemental call data 320 and may be configured to forward supplemental call data 320 to emergency management system (EMS) 312 to support ECC system operations. EMS 312 supports ECC system operations by providing information that is presently unavailable from 911 call data 318, according to an embodiment.

ECC network 306 may receive 911 call data 318 from 911 service system 304, for example, through networks 316 and may be operable to dispatch (e.g., communicate with and request the services of emergency responders 308), in response to receipt of 911 call data 318. ECC network 306 may represent communicatively coupled ECCs of a county, state, region within a state, providence, prefecture, country, and/or another geographic organization structure of a territory, according to an embodiment. ECC network 306 may include multiple ECC systems 336 which may be individually referenced as ECC system 336A, 336B, . . . 336 M, for example. ECC systems 336 may query one or more external databases to acquire primary location data 338 based on device IDs 324 and may query EMS 312 for device-based location data 326 in order to more accurately identify the locations of mobile devices 302 and the location of the incident that caused the 911 call. Based on the location data received, one of ECC systems 336 communicates with one or more responder devices 340 to request assistance from emergency responders 308 to the scenes or locations of mobile devices 302.

EMS 312 is configured to generate emergency call analytics 342 based on supplemental call data 320 and based on queries 346 from ECC systems 336 to request device-based location data 326, according to an embodiment. EMS 312 is operable to generate 911 outage alerts or outage scores that represent a likelihood of an outage of 911 service system 304, based on emergency call analytics 342, according to an embodiment. Emergency call analytics 342 may not specify a specific component of 911 service system 304 that experiences an outage but may indicate that one or more of routers 330, switches 332, geographic data 334, and/or additional hardware or software 348 may not be providing 911 call data 318 that was transmitted from one or more mobile devices 302, according to an embodiment.

EMS 312 may generate and/or distribute one or more outage notifications 314 to systems and/or personnel to whom a 911 service outage may be relevant. For example, 911 outage alert 344 may be provided in one or more outage notifications 314 and delivered to one or more ECC administrators 350, one or more state directors 352, or one or more other (e.g., regionally adjacent) ECCs 354, according to an embodiment.

FIG. 3B illustrates a diagram of an emergency response environment 360 that includes additional example features and/or operability of some of the components of emergency response environment 300, in accordance with aspects of the disclosure. ECC system 336A is one example of any one of ECC systems 336 that may be used in and/or operate in emergency response environment 360, according to an embodiment. ECC system 336A may include call handling equipment (CHE) 362, LIS request logic 364, and location services 366, according to an embodiment. ECC system 336A may also include an emergency response application 368 that has a UI 370 that is operable to display and associate device IDs 324 with device-based location data 326, according to an embodiment. UI 370 may also be configured to display various analytics visuals 372 that are generated by and provided by EMS 312, according to an embodiment.

CHE 362 allows ECC telecommunicators to receive calls from mobile devices 302 and to see callers' locations, for example, using location services 366. CHE 362 includes telephony devices 374 and primary call data 376. Telephony devices 374 may include servers, switches, routers, location searching services, telephones, voice over IP (VOIP) conversion hardware/firmware, and the like. Telephony devices 374 receive and convert 911 call data 318 (e.g., audio data 322) into audible signals for telecommunicators.

Primary call data 376 represents 911 call data 318 combined with primary location data 338. CHE 362 may be configured to request or acquire primary location data 338 from one or more location-based databases using device IDs 324. Primary location data 338 typically includes locations of mobile devices 302 that are determined by the cell phone tower or cell phone towers that receive 911 call data 318. Primary location data 338 may be representative of a best guess location of a caller based on a single tower or may be based on triangulation using two, three, or more cell phone towers that are in communication with the one or more mobile devices 302, for example. CHE 362 is configured to provide primary location data 338 along with device IDs 324 to location services 366 to support operation of computer-aided dispatch (CAD) system 378 and/or a mapping application 380. Primary location data 338 is typically deficient in that its range of accuracy. The range of accuracy can be hundreds to thousands of meters around a caller's actual location.

To help reduce the ambiguity of location of primary location data 338, ECC system 336A may integrate LIS request logic 364 into CHE 362 and/or into CAD system 378 to acquire device-based location data 326 from EMS 312.

By contrast to primary location data 338, device-based location data 326 may have an accuracy of single-digit meters to tens of meters in any direction and is based on global positioning satellites (GPS), connections to local Wi-Fi networks, connections to other nearby devices, or other satellite communications by mobile devices 302. LIS request logic 364 includes several features that enable ECC system 336 to acquire device-based location data 326. LIS request logic 364 may send queries 346 based on device IDs 324 to LIS service 384 provided by EMS 312. LIS request logic 364 may use various API 380 to interact with LIS service 384 and/or LIS data structure 386 to receive replies 387 that include device-based location data 326 corresponding to device IDs 324, according to an embodiment. For example, LIS request logic 364 may submit a HELD request with one or more device IDs 324 to EMS 312. In response to the HELD request, EMS 312 may be configured to reply with device-based location data 326 (e.g., formatted in XML), for example. Upon receipt of device-based location data 326, LIS request logic 364 provides device-based location data 326 to mapping application 380, CAD system 378, and/or other location services 366 to support dispatching emergency responders 308 to 911 calls.

EMS 312 is configured to use queries 346 and supplemental call data 320 to generate various analytics and to determine the likelihood of an outage of 911 service system 304, in accordance with aspects of the disclosure. In one embodiment, based on particular metrics, EMS 312 may identify a 911 service outage in near real-time (e.g., with a delay of just a few seconds to a few minutes). In one embodiment, EMS 312 may be operable to analyze prior data in search of anomalous data that is indicative of a 911 service outage. EMS 312 includes LIS service 384, LIS data structure 386, analytics engine 388, analytics data structure 389, and a notification service 390, in accordance with aspects of the disclosure. LIS service 384 is operable to provide device-based location data 326 in response to queries 346 received from ECC system 336A. LIS service 384 may maintain LIS data structure 386 to associate device-based location data 326 with device IDs 324 and timestamp data 328, according to an embodiment. LIS data structure 386 may also associate supplemental call data 320 with queries 346, allowing a determination of which device IDs 324 have been queried verses which have not (e.g., a missed call count that may indicate a loss of 911 service).

Analytics engine 388 may be configured to maintain analytics data structure 389 with various analytics data 391. Analytics engine 388 is operable to generate various analytic metrics from queries 346 and supplemental call data 320, according to an embodiment. Analytics engine 388 is operable to, for example, generate call metrics 392 and query metrics 393, to support determining 911 outage alert 344, according to an embodiment. Call metrics 392 and query metrics 393 may be at least partially compared to one or more thresholds 394 to generate a likelihood of a 911 service outage, for example. Analytics engine 388 may use analytics data 391 to generate one or more analytics visuals 372, which may be displayed by UI 370 of emergency response application 360 at ECC system 336A (e.g., at a PSAP), according to an embodiment.

Notification service 390 may be configured to generate a notification message 395 that includes 911 outage alert 344. Notification message 395 and 911 outage alert 344 may be distributed as outage notifications 314 to various ECC stakeholders.

Figure 4:
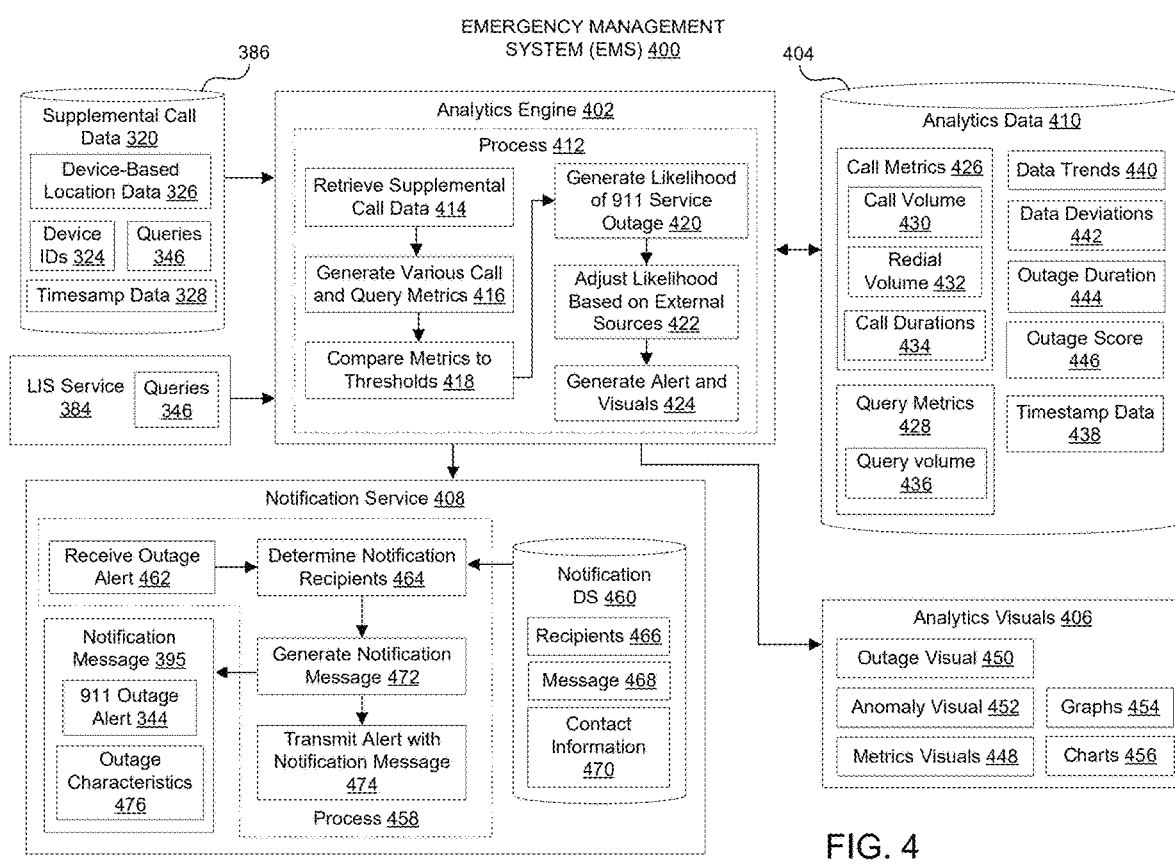
FIG. 4 illustrates a diagram of an emergency management system, in accordance with embodiments of the disclosure.

FIG. 4 illustrates a diagram of an EMS 400 that is operable to determine a likelihood of a 911 service outage and provide outage alerts and analytics visuals to inform operations of an ECC (e.g., a PSAP), in accordance with aspects of the disclosure. EMS 400 includes LIS service 384, LIS data structure 386, analytics engine 402, analytics data structure 404, analytics visuals 406, and a notification service 408 to support notifying and informing personnel associated with ECC operations, according to an embodiment.

Analytics engine 402 is operable to generate analytics data 410 and analytics visuals 406 based on supplemental call data 320 and queries 346, according to an embodiment. Analytics engine 402 may be one of a number of software modules stored and executed by EMS 400. Analytics engine 402 may perform a number of operations, and some of those operations are included in process 412, according to an embodiment. Process 412 includes operations for determining the likelihood of a 911 service outage, in accordance with aspects of the disclosure. The order in which some or all of the process operation blocks appear in process 412 should not be deemed limiting. Rather, one of ordinary skill in the art having the benefit of the present disclosure will understand that some of the process blocks may be executed in a variety of orders not illustrated, or even in parallel.

At operation 414, process 412 retrieves supplemental call data, according to an embodiment. Analytics engine 402 may retrieve, query, copy, or otherwise acquire supplemental call data 320 from LIS data structure 386.

At operation 416, process 412 generates various call and query metrics, according to an embodiment. The call and query metrics may be associated with various types of analytics data 410 (e.g., timestamps, data trends, etc.) in analytics data structure 404, according to an embodiment. Call metrics may include, but are not limited to, call volume, call redial volume, call duration metrics (e.g., accumulative call duration, average call duration, call duration rate changes, etc.), data trends, data deviations (e.g., spikes, troughs, etc.), rates of change (e.g., calculated using a derivative), average metrics, ratios, percentages over/under baseline data, and the like.

At operation 418, process 412 compares metrics to one or more thresholds, according to an embodiment. Analytics engine 402 may compare one or more individual metrics to one or more particular thresholds, may compare two or more metrics to one, two, or more thresholds, and/or may apply combinations of metrics (e.g., ratios or percentages over/under baseline) to one or more thresholds to determine a likelihood of a 911 service outage, according to an embodiment. The thresholds may differ based on geography of the 911 call. For example, a 911 outage that happens in a very dense area (e.g., an urban area) may experience a drop in query volume that may be observed rapidly (e.g., within 10-20 seconds, under a minute, etc.) because the baseline is that several people call 911 in short periods of time. However, if it is a less populated area (e.g., rural areas), the baseline for 911 call volume may be lower and a drop in query volume may take 3-5 minutes (or more) to detect with actionable certainty, for example. In one embodiment, the thresholds include rates for one or more metrics (e.g., queries received per minute).

At operation 420, process 412 generates a likelihood of a 911 service outage, according to an embodiment. The likelihood of a 911 service outage may be represented as an outage score (e.g., a score between 0 and 100), a text-based metric (e.g., low, medium, high likelihood), and/or as a graphical representation (e.g., using a dial, arrow, or other representation), in accordance with embodiments of the disclosure. The likelihood of a 911 service outage may be initially defined as greater than 50% or less than 50%, for example. An initial indication of the likelihood of a 911 service outage is a sudden drop (e.g., to near zero) of query volume combined with a spike in call volume (which may be caused by redials and can be typical caller behavior when 911 does not work with an initial call). The likelihood of a 911 service outage may be increased if a sudden increase in redial volume is observed. The likelihood of a 911 service outage may be further increased if a sudden decrease in call duration is observed. The likelihood of a 911 service outage is assigned to highly likely (e.g., 95 out of a 100) if all four factors exist concurrently—that is: drop in query volume at the EMS, rise in call volume, rise in redial volume, and decrease in call duration over a period of time (e.g., 30 seconds-5 minutes), according to an embodiment.

At operation 422, process 412 adjusts the likelihood of a 911 service outage based on one or more external sources, according to an embodiment. External sources may include, but are not limited to, social media feeds, news feeds, weather feeds, traffic feeds, telecommunications companies (e.g., wireless carriers) media feeds, or the like, according to an embodiment. Analytics engine 402 may be configured to query a 911 outage confidence service (e.g., 911 outage confidence system 600 shown on FIG. 6) to obtain an outage confidence level/score with which to modify the outage score, according to an embodiment.

At operation 424, process 412 generates 911 outage alert 344 and analytics visuals 406, according to an embodiment. 911 outage alert 344 may be used by notification service 408 to prepare and transmit a notification message 395 to various recipients. Analytics visuals 406 may be provided to an ECC over an emergency response application that is hosted, provided, and/or updated by EMS 400, according to an embodiment.

Analytics data structure 404 illustrates some of the examples of analytics data 410 that may be generated and/or maintained by analytics engine 402 to determine the likelihood of a 911 service outage, in accordance with aspects of the disclosure. Analytics data 410 includes, but is not limited to: call metrics 426 and query metrics 428, according to an embodiment. Call metrics 426 may include values, rates of change, averages, and/or comparisons of call volume 430, redial volume 432, and call durations 434, according to an embodiment. Query metrics 428 may include values, rates of change, averages, and/or comparisons query volume 436, according to an embodiment. Analytics data 410 may also include timestamps 438 from which call metrics 426 and/or query metrics 428 may be at least partially derived or inferred.

Analytics data 410 also includes data trends 440, data deviations 442, outage duration 444, and an outage score 446, in accordance with aspects of the disclosure. Data trends may be defined over historical periods of time, such as, but not limited to, over days, weeks, months, years, hours, and the like. Data trends 440 may be used to establish baseline data from which data deviations 442 are determined, according to an embodiment. Data deviations 442 may include spikes and drops in values and/or in relation to baselines. Outage duration 444 may be determined using timestamps 438 and combinations of call metrics 426 and query metrics 428 in combination with one or more outage definitions and/or thresholds, according to one embodiment. Outage score 446 may be a numerical or text-based representation of the likelihood of a 911 service outage.

Analytics visuals 406 include metrics visuals 448, outage visuals 450, and anomaly visuals 452. Metrics visuals 448, outage visuals 450, and anomaly visuals 452 may be represented by one or more graphs 454 and/or charts 456 that are presented in one or more user interfaces, in accordance with aspects of the disclosure.

Notification service 408 includes a process 458, a notification data structure 460, and notification message 395. By executing process 458, notification service 408 may be configured to use notification data structure 460 to at least partially generate notification message 395, according to an embodiment. Process 458 includes a number of operations. The order in which some or all of the process operation blocks appear in process 458 should not be deemed limiting. Rather, one of ordinary skill in the art having the benefit of the present disclosure will understand that some of the process blocks may be executed in a variety of orders not illustrated, or even in parallel.

At operation 462, process 458 receives an outage alert (e.g., from analytics engine 402), according to an embodiment.

At operation 464, process 458 determines notification recipients, according to an embodiment. Notification recipients may be determined by querying and/or reading information from notification data structure 460, according to an embodiment. For example, process 458 may query notification data structure 460 for recipients 466, a predefined message 468, and/or contact information 470 for generating notification message 395, according to an embodiment.

At operation 472, process 458 generates a notification message, according to an embodiment.

At operation 474, process 458 transmits an alert with a notification message, according to an embodiment. The alert may be 911 outage alert 344, and the notification message may be notification message 395, according to an embodiment. Notification message 395 may include outage characteristics 476 that may include, but are not limited to, outage duration 444, data trends 440, data deviations 442, call metrics 426, query metrics 428, and/or outage score 446, in accordance with embodiments of the disclosure.

Figure 5:
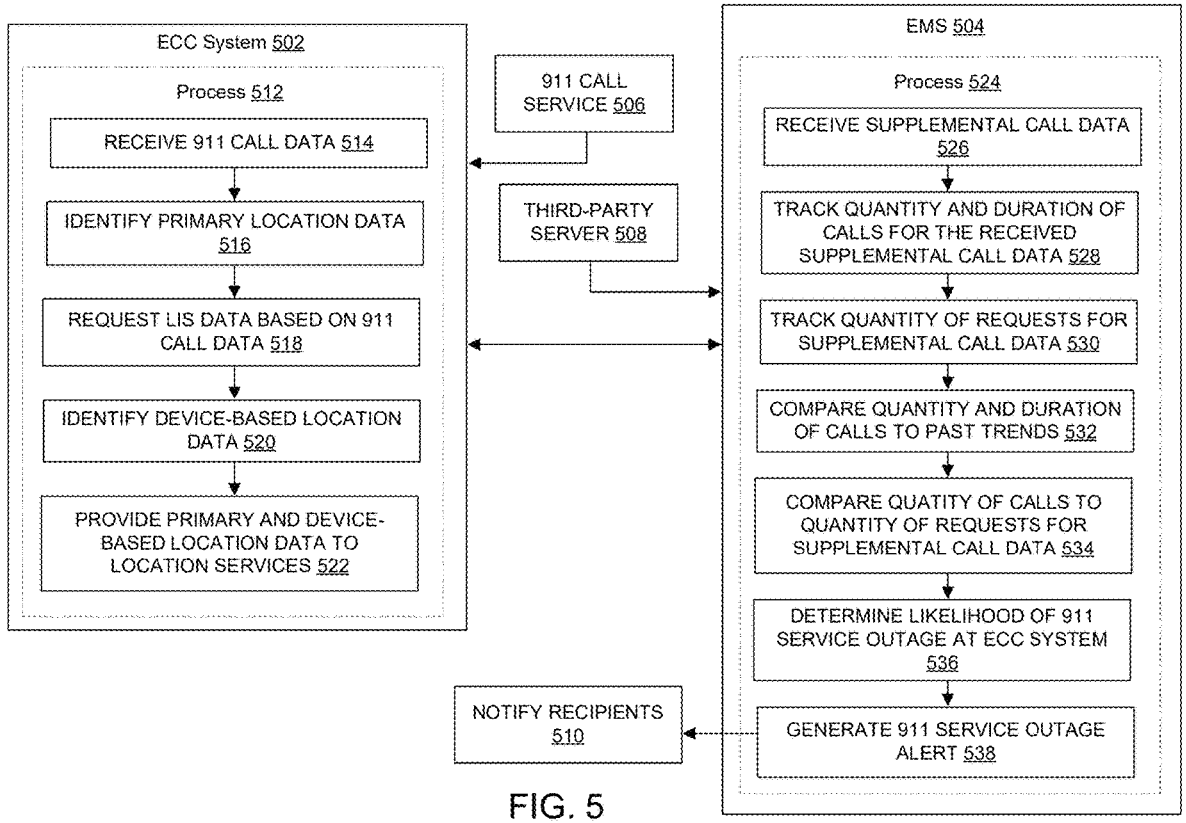
FIG. 5 illustrates a flow diagram of a process for generating a 911 service outage alert, in accordance with embodiments of the disclosure.

FIG. 5 illustrates a system 500 that is operable to detect 911 service outages at an ECC, in accordance with aspects of the disclosure. System 500 includes an ECC system 502, an emergency management system (EMS) 504, a 911 call service 506, third-party server 508, and alert recipients 510, according to an embodiment. ECC system 502 may be configured to execute a process 512 for operating an ECC system, according to an embodiment.

At operation 514, process 512 receives 911 call data from 911 call service 506, according to an embodiment.

At operation 516, process 512 identifies primary location data, according to an embodiment.

At operation 518, process 512 requests LIS data from EMS 504 based on 911 call data, according to an embodiment.

At operation 520, process 512 identifies device-based location data, according to an embodiment.

At operation 522, process 512 provides primary and device-based location data to location services (mapping systems and/or CAD systems), according to an embodiment.

EMS 504 communicatively coupled to ECC System 502 and is operable to execute or run a process 524 for determining the likelihood of a 911 service outage at an ECC system, according to an embodiment. Process 524 includes a number of operations. The order in which some or all of the process operation blocks appear in process 524 should not be deemed limiting. Rather, one of ordinary skill in the art having the benefit of the present disclosure will understand that some of the process blocks may be executed in a variety of orders not illustrated, or even in parallel.

At operation 526, process 524 receives supplemental call data, according to an embodiment. EMS 504 may receive the supplemental call data from third-party server 508, according to an embodiment.

At operation 528, process 524 tracks the quantity and duration of calls for the received supplemental call data, according to an embodiment.

At operation 530, process 524 tracks the quantity of requests for the supplemental call data from ECC system 502, according to an embodiment.

At operation 532, process 524 compares the quantity and duration of calls to past trends, according to an embodiment.

At operation 534, process 524 compares the quantity of calls to the quantity of requests for supplemental call data, according to an embodiment.

At operation 536, process 524 determines the likelihood of a 911 service outage at an ECC system, according to an embodiment.

At operation 538, process 524 generates a 911 service outage alert based on the likelihood of a 911 service outage, according to an embodiment. EMS 504 may then notify various recipients of the 911 service outage or of the likelihood of the 911 service outage, for example, in operation 510, according to an embodiment.

Outage Confidence System

Figure 6:
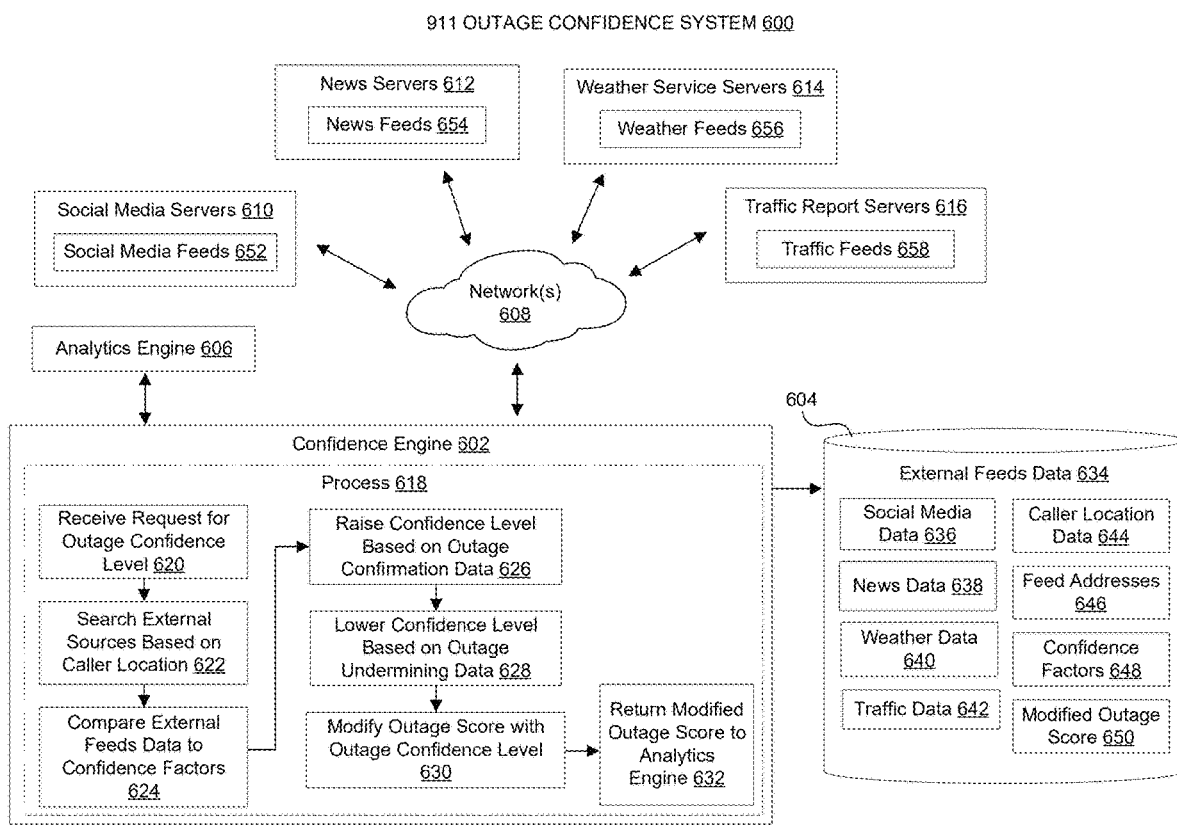
FIG. 6 illustrates a diagram of a 911 outage confidence system, in accordance with embodiments of the disclosure.

FIG. 6 illustrates a 911 outage confidence system configured to provide a 911 outage confidence service to, for example, an EMS, according to an embodiment. 911 outage confidence system 600 includes a confidence engine 602, an external feeds data structure 604, and an analytics engine 606, according to an embodiment. Confidence engine 602 may be configured to use one or more networks 608 to communicate with social media servers 610, news servers 612, weather service servers 614, and/or traffic report servers 616, according to various implementations of the disclosure.

Confidence engine 602 is configured to communicate with various external data feeds sources to determine an outage confidence level and to modify an outage score that may be produced and/or generated by analytics engine 606, according to an embodiment. Confidence engine 602 may be configured to execute or run a process 618 for modifying an outage score based on external data feed sources, according to an embodiment. Process 618 may include a number of operations that may be performed by confidence engine 602, according to an embodiment. The order in which some or all of the process operation blocks appear in process 618 should not be deemed limiting. Rather, one of ordinary skill in the art having the benefit of the present disclosure will understand that some of the process blocks may be executed in a variety of orders not illustrated, or even in parallel.

At operation 620, process 618 receives a request for an outage confidence level (e.g., from analytics engine 606), according to an embodiment.

At operation 622, process 618 searches external sources based on caller location, according to an embodiment.

At operation 624, process 618 compares external data feeds to confidence factors, according to an embodiment. Confidence factors may be text found in feeds that support or undermine the likelihood of anomalous call patterns being associated specifically with a 911 service outage. For example, social media feeds 652 include information about people not getting through to 911 or questions like "is 911 down?", then this information would be a confidence factor that increases the outage confidence level. Similarly, if news feeds 654 or telecommunications company feeds mention "911 unavailable" or the like, this information would be a confidence factor that increases the outage confidence level, e.g., by 10-20 points. However, if weather feeds 656 or traffic feeds 658 mention events such as car pile-up, hurricane, tornado, flash flood, earthquake, fire, then these events around the location of the callers may also contribute to anomalous call patterns and would therefore be used to decrease the confidence level, e.g., by −5 to −10 points, for example.

At operation 626, process 618 raises the confidence level of a 911 service outage based on outage confirmation data, according to an embodiment.

At operation 628, process 618 lowers confidence level of a 911 service outage based on outage undermining data, according to an embodiment.

At operation 630, process 618 modifies an outage score with the outage confidence level, according to an embodiment. The outage confidence level may be a multiplier between 0.1 and 2.0 that is multiplied by the outage score to increase or decrease the outage score based on the confidence level, for example. The outage confidence level can also be implemented as a number between −50 and 50 that is added to the outage score to increase or decrease the outage score, for example. If the outage score is displayed, provided, or otherwise implemented as a text-based notification (e.g., low likelihood, medium likelihood, high likelihood), the text-based notification may be translated from a numeric representation prior to conversion to a text-based notification. For example, an outage score of 0-33 may be converted to the text-based notification of "low likelihood of outage", an outage score of 33-66 may be converted to the text-based notification of "medium likelihood of outage", and an outage score of 66-100 may be converted to the text-based notification of "high likelihood of outage". Accordingly, modifying or weighting an outage score using outage confidence levels may translate into text-based outage notifications during translation of the outage score from numeric to text-based representation, in some implementations.

At operation 632, process 618 returns a modified outage score to analytics engine 606, according to an embodiment.

External feeds data structure 604 is configured to maintain external feeds data 634 for use by confidence engine 602, according to an embodiment. External feeds data 634 may include, but is not limited to, social media data 636, news data 638, weather data 640, traffic data 642, caller location data 644, feed addresses 646, confidence factors 648, and/or a modified outage score 650, according to various implementations of the disclosure.

Social media data 636 may include information gathered from one or more social media feeds 652 that may be hosted on one or more social media servers 610. Social media data 363 may be used to raise or lower the confidence level of a 911 service outage, according to an embodiment. For example, if social media feeds indicate that people are experiencing telecommunications services outages and/or are struggling to get through to 911, confidence engine 602 may raise the modified outage score 650 by 5, 10, or more points based on the content of the social media data 636. More specifically, a reference to an inability to get through to 911 could be considered a strong confirmation of the analytics data and may be used to raise the score by 20 points, may be used to elevate the outage score from medium likelihood to high likelihood, and/or may be used to trigger a notification event where notifications are immediately transmitted to ECC administrators, according to an embodiment.

News data 638 may include information gathered by confidence engine 602 searching news feeds 654 from one or more news servers 612, according to an embodiment. News data 638 may include indications of telecommunications service outages or people struggling to get through to 911, which may be used to increase modified outage score 650 and/or the outage confidence level. News data 638 may include information related to natural disasters (e.g., earthquake, fire, hurricane, etc.) or unnatural disasters (e.g., active assailant, train wreck, etc.), which may be used to decrease the modified outage score 650, as these types of events may contribute to anomalous call data patterns.

Weather data 640 may be collected by confidence engine 602 by searching one or more weather feeds 656 from one or more weather service servers 614. Weather data 640 may potentially reduce the outage confidence level, if a major weather event is detected. For example, a hurricane, earthquake, snowstorm, flood, etc. may contribute to anomalous call data patterns, without a 911 service outage.

Traffic data 642 may be appended to external feeds data structure 604 by confidence engine 602 by searching traffic feeds 658 from one or more traffic report servers 616, according to an embodiment. A traffic accident or other major traffic-related event (e.g., a bridge collapse) may cause a spike in the number of calls to 911 and may contribute to anomalous call data patterns that could be used reduce the outage confidence level.

Other data in external feeds data structure 604 may support determining or altering modified outage score 650. Caller location data 644 may be used by confidence engine 602 to narrowly search the various external data sources. Confidence engine 602 may read various feed addresses 644 (e.g., web addresses, Internet addresses, RSS feed address, etc.) to search for various external data. Confidence factors 648 may include, but are not limited to, confirming a telecommunications systems outage, receiving information related to people struggling to contact 911 services, major weather events, major traffic events, natural disasters, unnatural disasters, and the like. Modified outage score 650 may be an outage score received from analytics engine 606 and adjusted up or down based on outage confirming data, outage undermining data, or an overall outage confidence level. Confidence engine 602 may return the modified outage score 650 to analytics engine 606 (e.g., analytics engine 388 shown in FIG. 3B, analytics engine 402 show in FIG. 4) for distribution to various recipients through, for example, a notification service (e.g., notification service 408 shown in FIG. 4), according to an embodiment.

Analytics

Figure 7A:
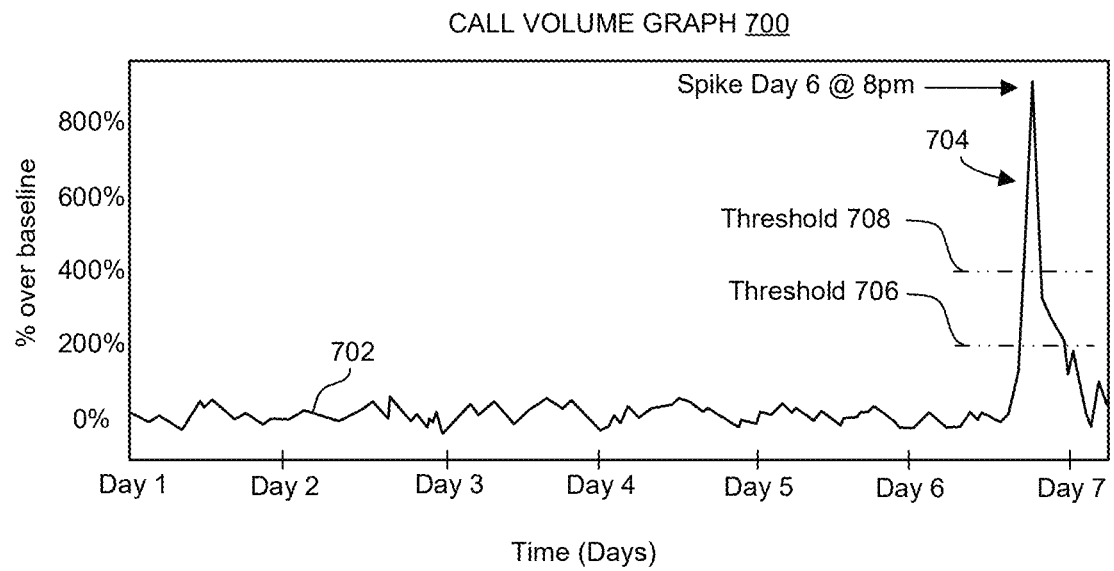
FIGS. 7A and 7B illustrate a graph and flow diagram related to outage scores based on call volume, in accordance with embodiments of the disclosure.
Figure 7B:
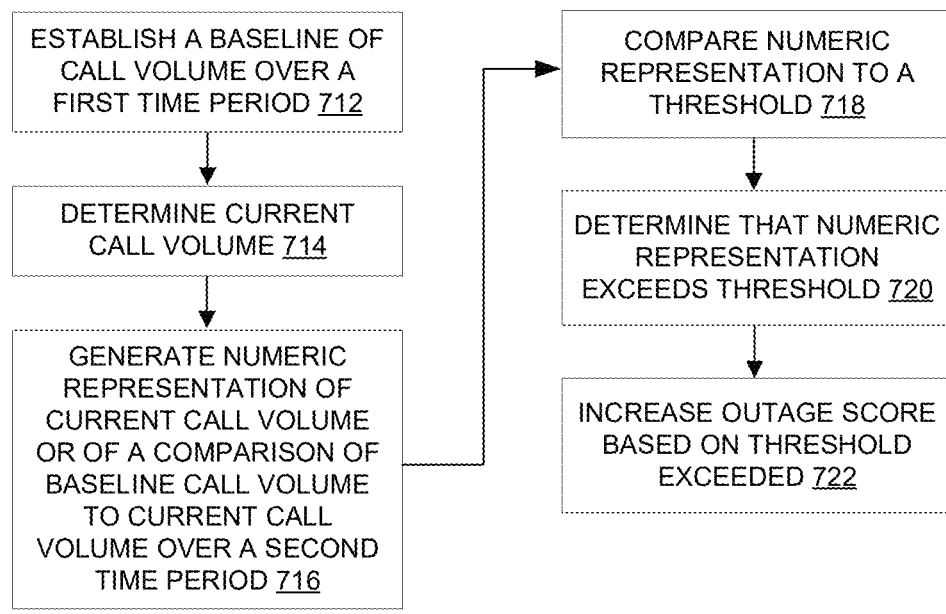

FIGS. 7A and 7B illustrate diagrams related to outage scores based on call volume, according to an embodiment. FIG. 7A illustrates a call volume graph 700 that illustrates anomalous behavior patterns in call volume that may be associated with a 911 service outage, a natural disaster, or some type of emergency-related event that causes a rapid increase in 911 call volume. Call volume graph 700 includes an x-axis representing time and a y-axis representing a percentage of call volume that is over (or under) baseline call volume. Call volume graph 700 includes a line 702 that represents connecting individual data points for call volume counts or percentages. Line 702 varies in amplitude based on a percentage of current call volume as compared to either a baseline call volume, typical call volume, or anticipated call volume, according to an embodiment. However, line 702 and call volume graph 700 could be easily modified to represent numbers of calls over a time period or ratios of current to baseline volumes of calls, instead of percentage of calls that are over/under a baseline, for example. The percentage may be calculated by finding the difference between current and baseline calls, dividing the difference by the baseline, and multiplying the result by 100 (i.e., 100* (current volume−baseline volume)/(baseline volume)), for example. Line 702 includes a spike in calls 704 that is represented as a rapid increase in relative call volume. A spike is one type of data deviation from a data trend that may be indicative of 911 service issues or that may be indicative of an emergency-related event. Various systems and methods of the disclosure may use a first threshold 706 (e.g., at 200% over baseline) and/or may use a second threshold 700 (e.g., at 400% over baseline) to modify (e.g., increase) the outage score or likelihood of a 911 outage, according to an embodiment.

FIG. 7B illustrates a flow diagram of a process 710 for modifying an outage score based on call volume, in accordance with aspects of the disclosure. Process 710 represents an algorithm or set of instructions that may be included in one or more software modules and that may be executed or run by an EMS, according to an embodiment. Process 710 may include various operation blocks to support the process for modifying an outage score based on call volume. Process 710 is an example process that may be performed or incorporated into memory, servers, and/or software modules of an EMS (e.g., EMS 312 and/or EMS 400), as disclosed herein. The order in which some or all of the process operation blocks appear in process 710 should not be deemed limiting. Rather, one of ordinary skill in the art having the benefit of the present disclosure will understand that some of the process blocks may be executed in a variety of orders not illustrated, or even in parallel.

At operation 712, process 710 includes establishing a baseline of call volume over a first time period, according to an embodiment. The baseline of call volume may be based on one or more previous hours, days, weeks, months, and/or years of call volume history.

At operation 714, process 710 includes determining current call volume, according to an embodiment. Current call volume may be determined or generated with an analytics engine using supplemental call data. Current call volume may include a window of 15 seconds to 5 minutes that is compared against baseline call volume for a similar time of day and/or day of the week.

At operation 716, process 710 includes generating a numeric representation of the current call volume or of a comparison of baseline call volume to current call volume over a second time period (e.g., using a sliding window of 15 seconds-10 minutes), according to an embodiment.

At operation 718, process 710 includes comparing the numeric representation to a threshold (e.g., threshold 706, 708, etc.), according to an embodiment.

At operation 720, process 710 includes determining that the numerical representation exceeds the threshold, according to an embodiment.

At operation 722, process 710 includes increasing an outage score based on the threshold being exceeded, according to an embodiment.

Figure 8A:
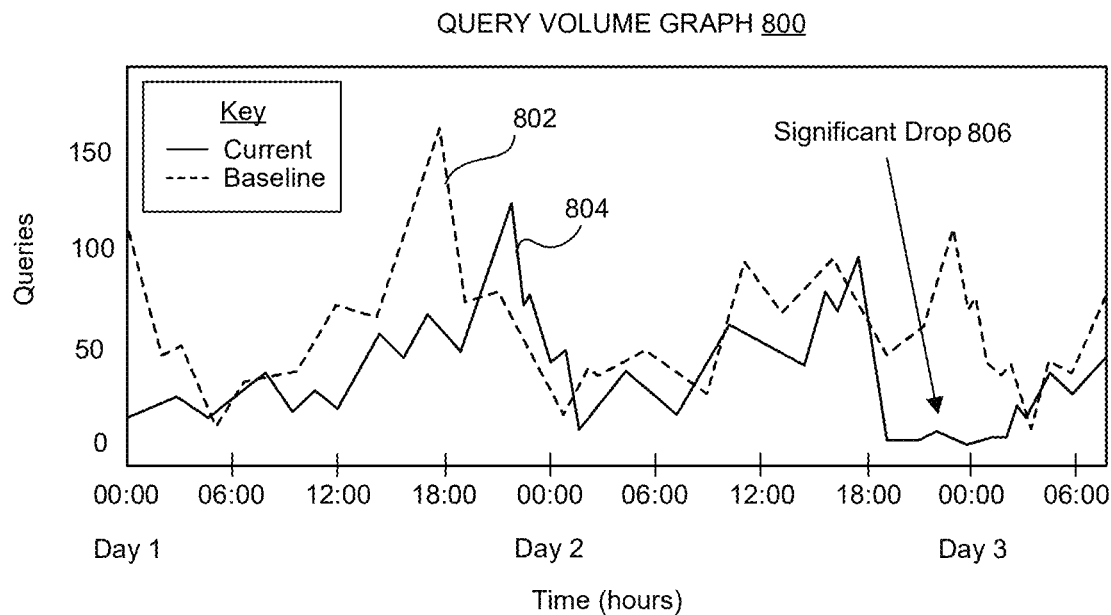
FIGS. 8A and 8B illustrate a graph and flow diagram related to outage scores based on location query volume, in accordance with embodiments of the disclosure.
Figure 8B:
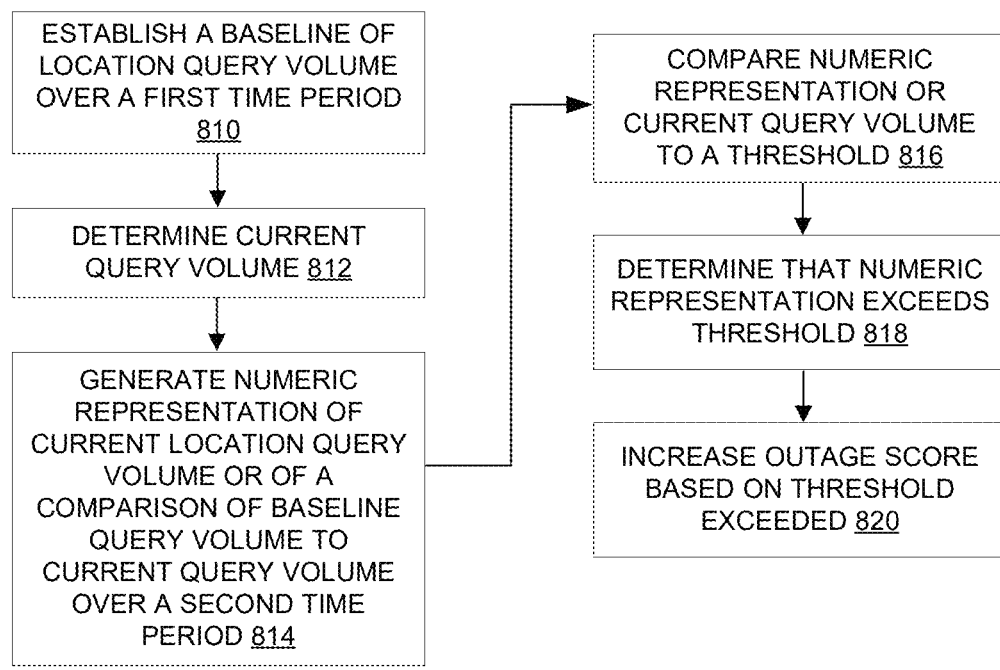

FIGS. 8A and 8B illustrate diagrams related to outage scores based on query volume, according to an embodiment. FIG. 8A illustrates a query volume graph 800 that illustrates anomalous behavior patterns in (location) query volume that may be associated with a 911 service outage. Query volume graph 800 includes an x-axis representing time and a y-axis representing a current query volume and a baseline query volume. Query volume graph 800 includes a line 802 and a line 804. Line 802 represents connecting individual data points for baseline query volume, and line 804 represents connecting individual data points for current query volume. Line 804 illustrates a drop 806 in current query volume 804 that is represented as a sustained drop (e.g., a drop over minutes, tens of minutes, and/or hours) in current query volume. Drop 806 in current query volume 804 may be used as an absolute number (e.g., less than 2 queries) and compared to a duration threshold (e.g., more than 30 seconds) and/or a quantity threshold (e.g., less than 10 calls per 10 minutes). Drop 806 in current query volume 804 may be represented as a ratio of current query volume verses historical (baseline) query volume to indicate a percentage of decreased query volume, and a percentage threshold (e.g., less than 20% of baseline or less than −20% of baseline) may be used to increase an outage score. The likelihood of the 911 service outage may be based on the query volume dropping (e.g., relative to a baseline query volume) for the PSAP at the same time of day, for the same day of the week (e.g., Friday nights), and/or for the same time of the year (e.g., on the 4th of July, New Year's Eve, etc.)

FIG. 8B illustrates a flow diagram of a process 808 for modifying an outage score based on query volume, in accordance with aspects of the disclosure. Process 808 represents an algorithm or set of instructions that may be included in one or more software modules and that may be executed or run by an EMS, according to an embodiment. Process 808 may include various operation blocks to support the process for modifying an outage score based on query volume. Process 808 is an example process that may be performed or incorporated into memory, servers, and/or software modules of an EMS (e.g., EMS 312 and/or EMS 400), as disclosed herein. The order in which some or all of the process operation blocks appear in process 808 should not be deemed limiting. Rather, one of ordinary skill in the art having the benefit of the present disclosure will understand that some of the process blocks may be executed in a variety of orders not illustrated, or even in parallel.

At operation 810, process 808 includes establishing a baseline of location query volume over a first time period, according to an embodiment. The baseline of location query volume may be based on one or more previous hours, days, weeks, months, and/or years of query volume history.

At operation 812, process 808 includes determining current location query volume, according to an embodiment. Current location query volume may be determined or generated by an analytics engine extracting query counts with timestamps from an LIS data structure (e.g., LIS data structure 386).

At operation 814, process 808 includes generating a numeric representation of the current location query volume or of a comparison of baseline location query volume to current location query volume over a second time period (e.g., using a sliding window of 15 seconds to 10 minutes), according to an embodiment.

At operation 816, process 808 includes comparing the numeric representation or current location query volume to a threshold (e.g., less than 10 queries in 10 minutes, less than −20 to −50% of baseline, etc.), according to an embodiment.

At operation 818, process 808 includes determining that the numerical representation exceeds (e.g., goes above or falls below) the threshold, according to an embodiment.

At operation 820, process 808 includes increasing an outage score based on the threshold being exceeded, according to an embodiment.

Figure 9A:
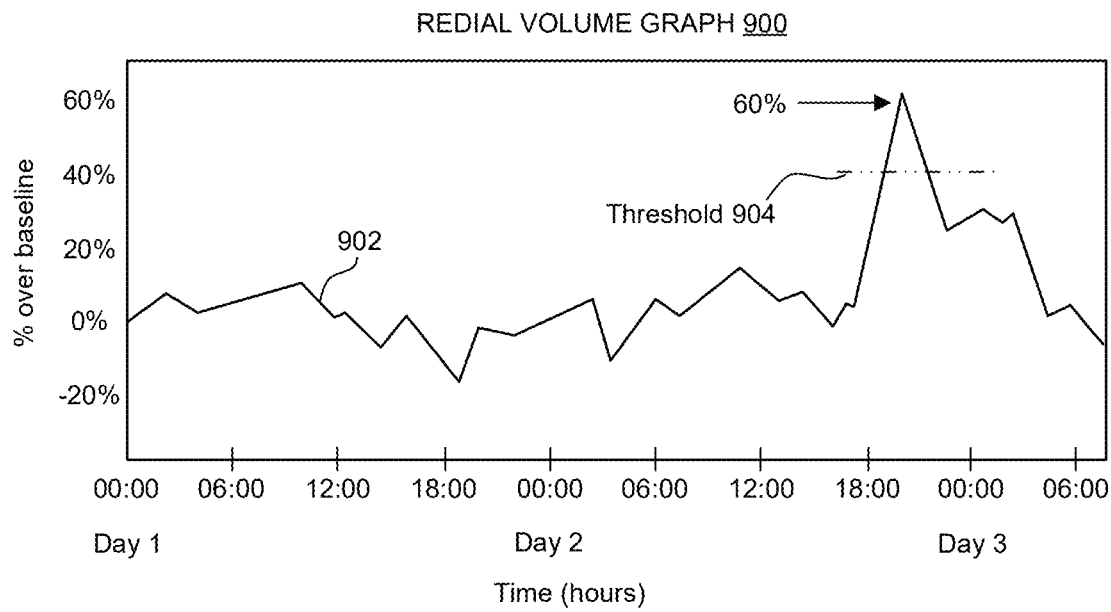
FIGS. 9A and 9B illustrate a graph and flow diagram related to outage scores based on redial volume, in accordance with embodiments of the disclosure.
Figure 9B:
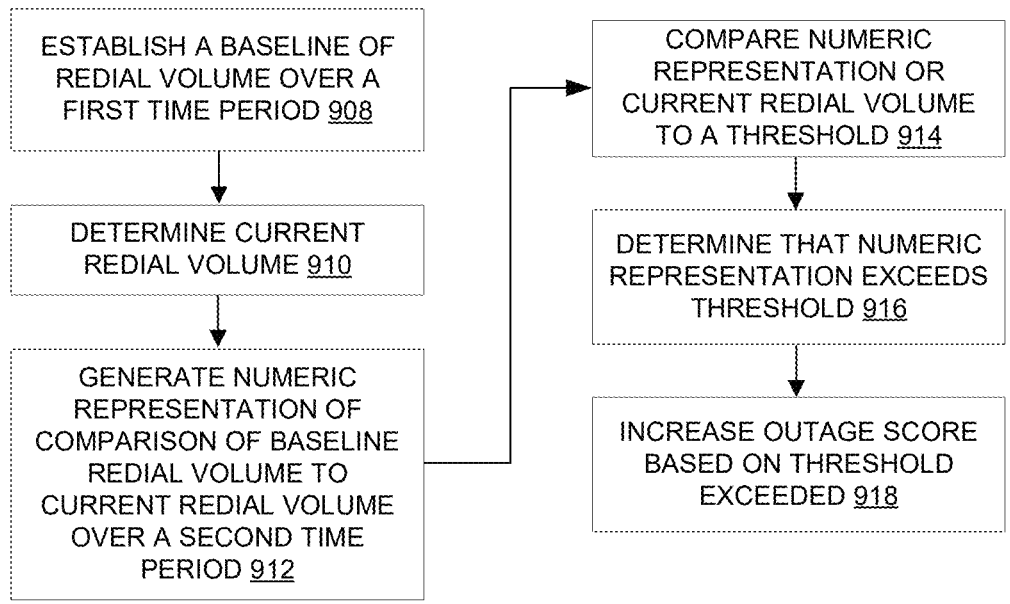

FIGS. 9A and 9B illustrate diagrams related to outage scores based on redial volume, according to an embodiment. A redial is a call placed to 911 that is subsequently followed by another call within a few seconds (2-10 seconds) to a few minutes (1-5 minutes) of a previous call. A redial may be determined using a data structure that associates device IDs (e.g., telephone numbers) with timestamps and with call counts, for example. FIG. 9A illustrates a redial volume graph 900 that illustrates anomalous behavior patterns in redial volume that may be associated with a 911 service outage. When people try to get through to 911 and are unable to because of an outage, the Inventors of the present disclosure discovered that people tend to redial 911—sometimes repeatedly. Redial volume graph 900 includes an x-axis representing time and a y-axis representing a percentage current redial volume that is over (or under) baseline redial volume. Separate baseline and current redial volume may be alternatively plotted separately rather than as a percentage of current redial volume over baseline redial volume, according to an embodiment. Redial volume graph 900 includes a line 902. Line 902 represents a connection of individual data points of a percentage of current redial volume over/under a baseline redial volume. A threshold 904 may be established at, for example 40%, as an additional indicator of a potential 911 service outage. In one embodiment, multiple thresholds for various call metrics (e.g., redial volume) and query metrics are established and the outage score is incrementally increased based on the number of thresholds that have been exceeded, for example.

FIG. 9B illustrates a flow diagram of a process 906 for modifying an outage score based on redial volume, in accordance with aspects of the disclosure. Process 906 represents an algorithm or set of instructions that may be included in one or more software modules and that may be executed or run by an EMS, according to an embodiment. Process 906 may include various operation blocks to support the process for modifying an outage score based on redial volume. Process 906 is an example process that may be performed or incorporated into memory, servers, and/or software modules of an EMS (e.g., EMS 312 and/or EMS 400), as disclosed herein. The order in which some or all of the process operation blocks appear in process 906 should not be deemed limiting. Rather, one of ordinary skill in the art having the benefit of the present disclosure will understand that some of the process blocks may be executed in a variety of orders not illustrated, or even in parallel.

At operation 908, process 906 includes establishing a baseline of redial volume over a first time period, according to an embodiment. The baseline of redial volume may be based on one or more previous hours, days, weeks, months, and/or years of redial volume history.

At operation 910, process 906 includes determining current redial volume, according to an embodiment. Current redial volume may be determined or generated by an analytics engine extracting call duration metrics using timestamp data and device IDs from an LIS data structure (e.g., LIS data structure 386).

At operation 912, process 906 includes generating a numeric representation of the current redial volume or of a comparison of baseline redial volume to current redial volume over a second time period (e.g., using a sliding window of 15 second to 5 minutes), according to an embodiment.

At operation 914, process 906 includes comparing the numeric representation or current redial volume to one or more thresholds (e.g., 20% over baseline, 30% over baseline, 40% over baseline, etc.), according to an embodiment.

At operation 916, process 906 includes determining that the numerical representation exceeds (e.g., goes above) the one or more thresholds, according to an embodiment.

At operation 918, process 906 includes increasing an outage score based on the threshold being exceeded, according to an embodiment.

Figure 10A:
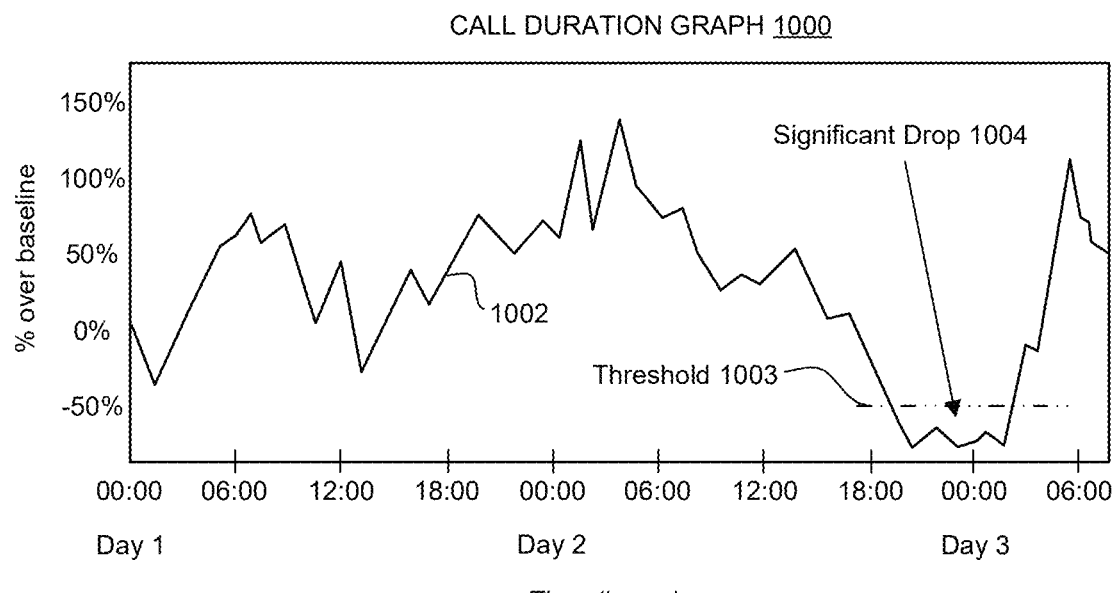
FIGS. 10A and 10B illustrate a graph and flow diagram related to outage scores based on call duration metrics, in accordance with embodiments of the disclosure.
Figure 10B:
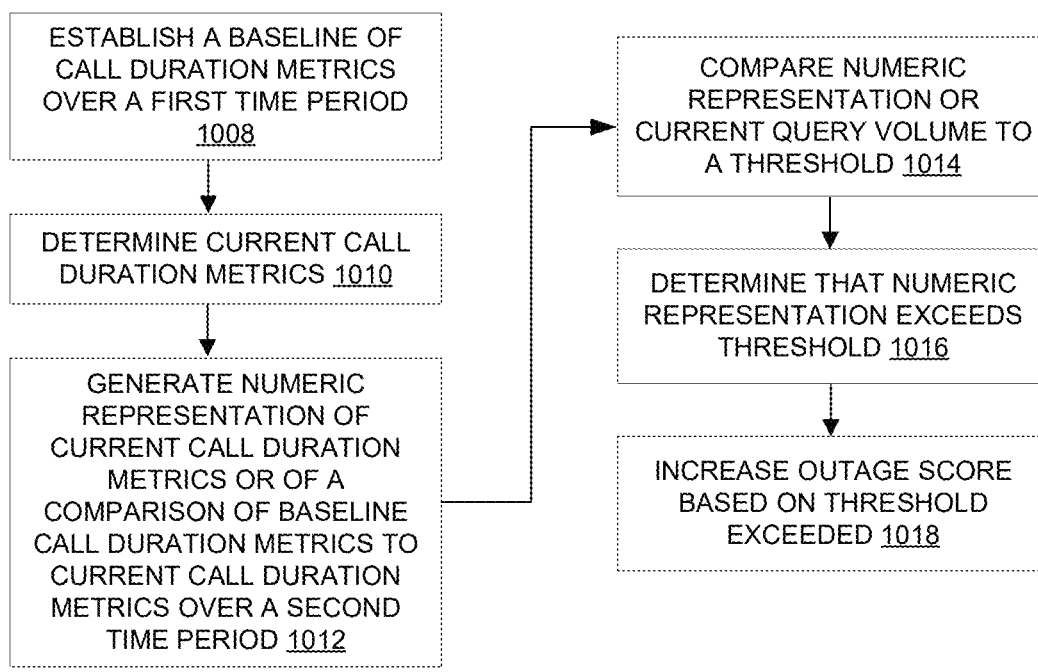

FIGS. 10A and 10B illustrate diagrams related to outage scores based on call duration metrics, according to an embodiment. Call duration metrics may include an average call duration for all the calls that occur during a particular window (e.g., every 10 seconds, 30 seconds, minute, 5 minutes, etc.). Call duration metrics may also include a sum of the duration of all calls made with the particular window, for example. Call duration may be determined using a data structure that associates device IDs (e.g., telephone numbers) with timestamps. For example, when an EMS receives supplementary call data, the supplementary data may include timestamps of the location data that are refreshed every 1-5 seconds, for example. During a mobile device phone call, call data and information data is timestamped regularly (e.g., each second to each few seconds). The call duration may then be inferred by the duration calculated by subtracting a first timestamp for a particular call from the last timestamp before the particular call ended, for example. FIG. 10A illustrates a call duration graph 1000 that illustrates anomalous behavior patterns in call duration that may be associated with a 911 service outage. When people try to get through to 911 and are unable to because of an outage, the Inventors of the present disclosure discovered that the call ends significantly sooner than the average or typical call to 911. As a result, a significant drop 1004 in call duration (e.g., call duration average, call duration percentage with respect to a baseline, sum of the duration of all calls over a period, etc.) for an extended period of time (e.g., 5 minutes, 10 minutes, 30 minutes, etc.) increases the likelihood that an ECC is experiencing an 911 service outage, in accordance with aspects of the disclosure. Call duration graph 900 includes an x-axis representing time and a y-axis representing a ratio between current and baseline call durations. Separate baseline and current call duration metrics (e.g., average call duration) may be alternatively plotted separately rather than as a ratio of current call duration divided by baseline call duration, according to an embodiment. Call duration graph 1000 includes a line 1002. Line 1002 represents a connection of individual data points of a percentage of current call duration metric over/under a baseline call duration metric. A threshold 1006 may be established at, for example −50%, as an additional indicator of a potential 911 service outage. In one embodiment, multiple thresholds for call duration metrics are established and the outage score is increased based on the number of thresholds that have been exceeded. For example, a first threshold could be set at −10% that increases the outage score by 5 points, a second threshold could be set for −20% that increases the outage score by another 5 points, and a third threshold could be set of −30% that increases the outage score by another 5 points. The reverse may also be true, where a first threshold could be set at +10% that decreases the outage score by 5 points, a second threshold could be set for +20% that decreases the outage score by another 5 points, and a third threshold could be set of +30% that decreases the outage score by another 5 points because normal or long calls to 911 may be an indicator that the callers are engaged in dialog with a telecommunicator at an ECC. A similar graduated threshold and point system may be applied to the other call metrics and to the query metrics to update the outage score.

FIG. 10B illustrates a flow diagram of a process 1006 for modifying an outage score based on call duration metrics, in accordance with aspects of the disclosure. Process 1006 represents an algorithm or set of instructions that may be included in one or more software modules and that may be executed or run by an EMS, according to an embodiment. Process 1006 may include various operation blocks to support the process for modifying an outage score based on call duration metrics. Process 1006 is an example process that may be performed or incorporated into memory, servers, and/or software modules of an EMS (e.g., EMS 312 and/or EMS 400), as disclosed herein. The order in which some or all of the process operation blocks appear in process 1006 should not be deemed limiting. Rather, one of ordinary skill in the art having the benefit of the present disclosure will understand that some of the process blocks may be executed in a variety of orders not illustrated, or even in parallel.

At operation 1008, process 1006 includes establishing a baseline of call duration metrics over a first time period, according to an embodiment. The baseline of call duration metrics may be based on one or more previous hours, days, weeks, months, and/or years of call duration metrics history.

At operation 1010, process 1006 includes determining current call duration metrics, according to an embodiment. Current call duration metrics may be determined or generated by an analytics engine extracting call duration metrics with timestamp data and device IDs from an LIS data structure (e.g., LIS data structure 386).

At operation 1012, process 1006 includes generating a numeric representation of the current call duration metrics or of a comparison of baseline call duration metrics to current call duration metrics over a second time period (e.g., using a sliding window of 2-10 minutes), according to an embodiment.

At operation 1014, process 1006 includes comparing the numeric representation or current call duration metrics to one or more thresholds (e.g., −10%, −20%, −30%, etc.), according to an embodiment.

At operation 1016, process 1006 includes determining that the numerical representation exceeds (e.g., goes below) the one or more thresholds, according to an embodiment.

At operation 1018, process 1006 includes increasing an outage score based on the threshold being exceeded, according to an embodiment.

Figure 11:
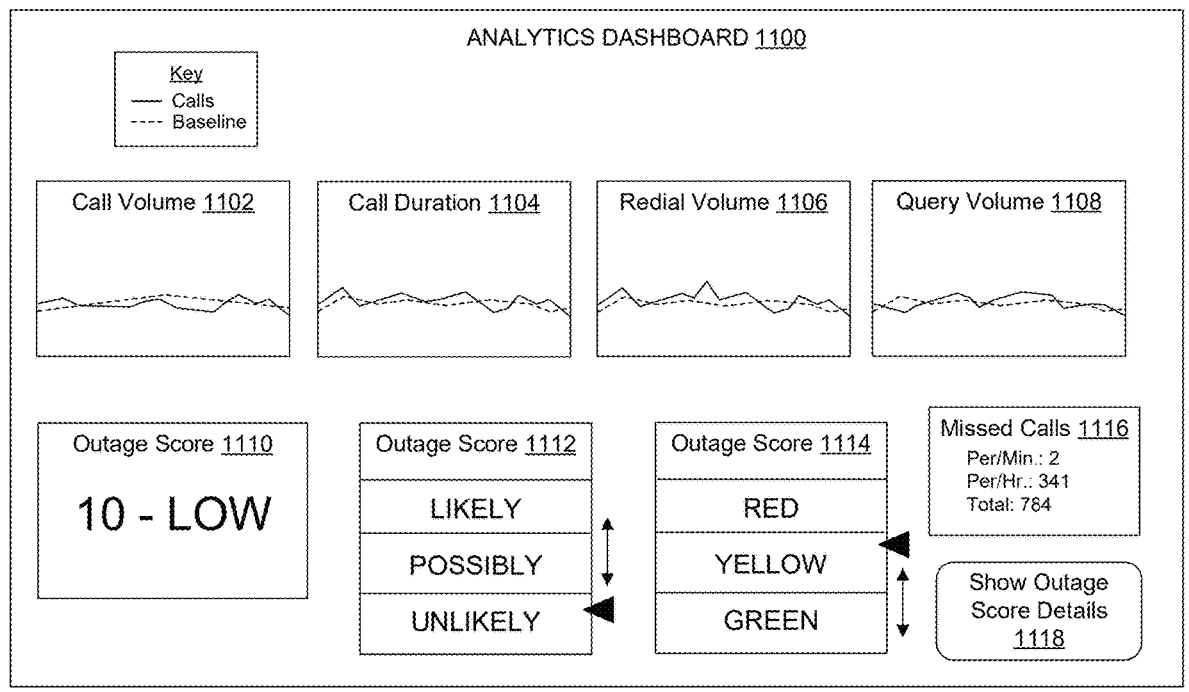
FIG. 11 illustrates a diagram of an analytics dashboard that may be used to display call metrics, query metrics, and various forms of outage scores, in accordance with embodiments of the disclosure.

FIG. 11 illustrates a diagram of an analytics dashboard 1100 that may be displayed at an ECC as an analytics visual (e.g., analytics visuals 406 shown in FIG. 4) to help dispatchers or other ECC administrative personnel (e.g., PSAP Directors, State PSAP Directors, etc.) to gauge the health status of 911 services being provided to the ECC, in accordance with aspects of the disclosure. Analytics dashboard 1100 may include a number of graphs and charts that help provide information about call metrics and query metrics that go into formulating a likelihood of a 911 service outage, according to an embodiment. Analytics dashboard 1100 may also display one or more visual representations of an outage score and/or a likelihood of a 911 service outage for the particular ECC. Analytics dashboard 1100 includes a call volume graph 1102, a call duration graph 1104, a redial volume graph 1106, and/or a query volume graph 1108. Graphs 1102, 1104, 1106, and 1108 may be representative of baseline data trends versus current data trends for call metrics and query metrics, according to an embodiment. Analytics dashboard 1100 may also include an outage score message window 1110, an outage score chart 1112, an outage score chart 1114, missed calls metrics window 1116, and/or a UI button 1118 that is configured to show outage score details when selected by a user, in accordance with aspects of the disclosure.

Figure 12:
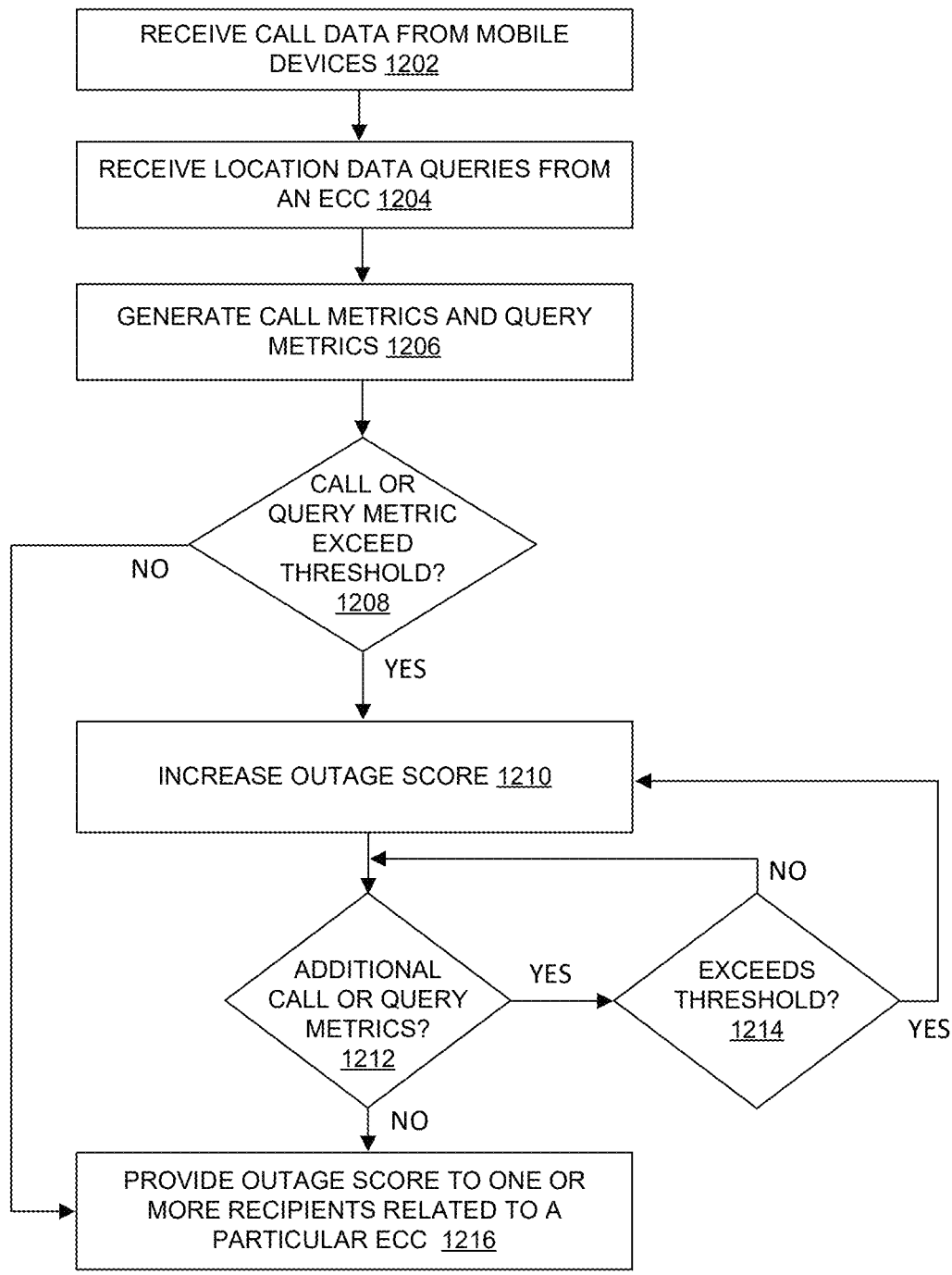
FIG. 12 illustrates a flow diagram of a process for generating an outage score based on call data and query data, in accordance with embodiments of the disclosure.

FIG. 12 illustrates a flow diagram of a process 1200 for generating an outage score based on call data and query data, in accordance with aspects of the disclosure. The call data may be supplemental call data received from a third-party server and that may include device-based location data, device IDs, and timestamp data for each 911 call made by mobile devices, according to an embodiment. Process 1200 represents an algorithm or set of instructions that may be included in one or more software modules and that may be executed or run by an EMS, according to an embodiment. Process 1200 may include various operation blocks to support the process for generating an outage score based on call data and query data. Process 1200 is an example process that may be performed or incorporated into memory, servers, and/or software modules of an EMS (e.g., EMS 312 and/or EMS 400), as disclosed herein. The order in which some or all of the process operation blocks appear in process 1200 should not be deemed limiting. Rather, one of ordinary skill in the art having the benefit of the present disclosure will understand that some of the process blocks may be executed in a variety of orders not illustrated, or even in parallel.

At operation 1202, process 1200 receives call data from mobile devices, according to an embodiment.

At operation 1204, process 1200 receives location data queries from an ECC, according to an embodiment.

At operation 1206, process 1200 generates call metrics, inquiry metrics, according to an embodiment.

At operation 1208, process 1200 determines whether a call or query metric exceeds a threshold, according to an embodiment. If a call or query metric exceeds a threshold, operation, total eight proceeds to operation 1210, according to an embodiment. If a call or query metric does not exceed a threshold, operation 1208 proceeds to operation 1216, according to an embodiment.

At operation 1210, process 1200 increases outage score that is indicative of a likelihood of a 911 service outage, according to an embodiment. New at operation 1212, process 1200 determines whether additional call or query metrics exist to be evaluated, according to an embodiment. If additional call or query metrics exist, operation 1212 proceeds to operation 1214, according to an embodiment. If additional call or query metrics do not exist, operation 1212 proceeds to operation 1216, according to an embodiment.

At operation 1214, process total hundred determines whether the additional call or query metric exceeds a threshold, according to an embodiment. If the additional call or query metric exceeds a threshold, operation 1214 proceeds to operation 1210 to further increase the outage score, according to an embodiment. If the additional call or query metric does not exceed a threshold, operation 1214 returns to operation 1212, according to an embodiment.

At operation 1216, process 1200 provides the outage score to one or more recipients related to a particular ECC, in accordance with aspects of the disclosure.

Figure 13:
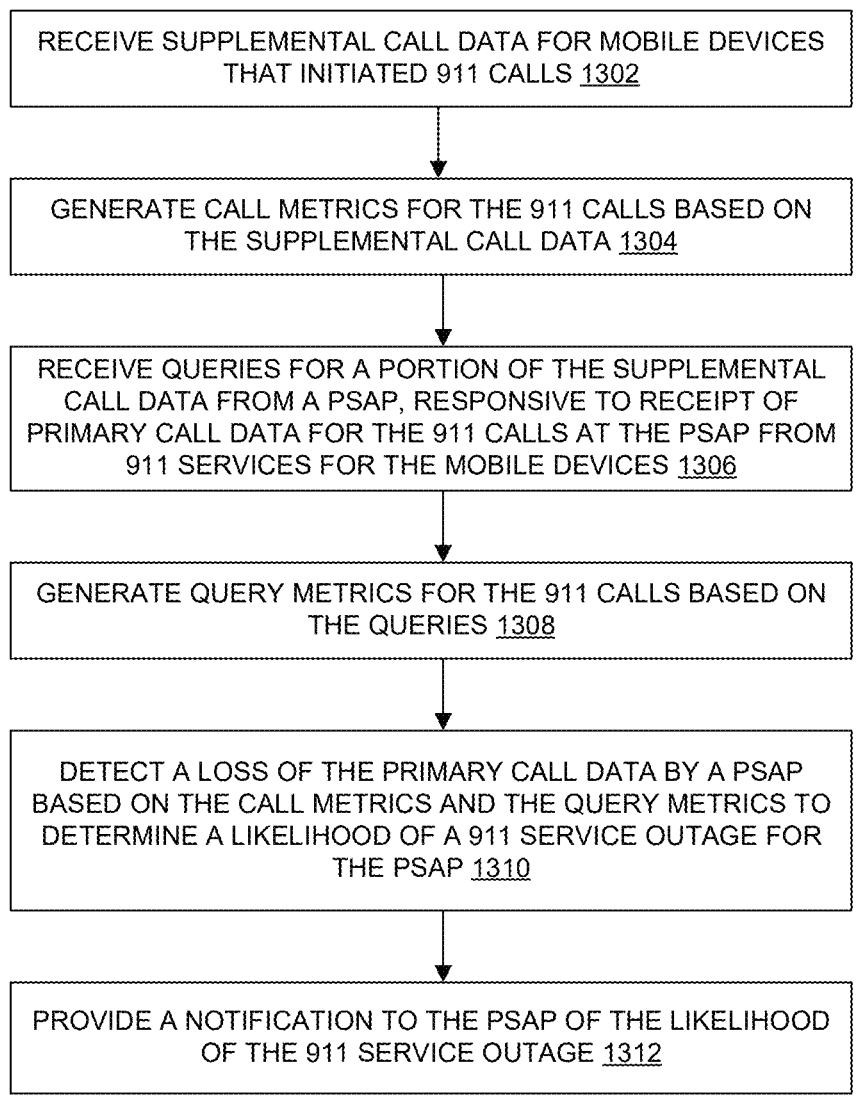
FIG. 13 illustrates a flow diagram of a process for determining a likelihood of a 911 service outage at a public safety answering point (PSAP), in accordance with embodiments of the disclosure.

FIG. 13 illustrates a flow diagram of a process 1300 for determining a likelihood of a 911 service outage at a public safety answering point (PSAP), in accordance with aspects of the disclosure. Supplemental call data received from a third-party server may include device-based location data, device IDs, and timestamp data for each 911 call made by mobile devices, according to an embodiment. Process 1300 represents an algorithm or set of instructions that may be included in one or more software modules and that may be executed or run by an EMS, according to an embodiment. Process 1300 may include various operation blocks to support the process for generating an outage score based on call data and query data. The outage score may represent the likelihood of a 911 service outage. Process 1300 is an example process that may be performed or incorporated into memory, servers, and/or software modules of an EMS (e.g., EMS 312 and/or EMS 400), as disclosed herein. The order in which some or all of the process operation blocks appear in process 1300 should not be deemed limiting. Rather, one of ordinary skill in the art having the benefit of the present disclosure will understand that some of the process blocks may be executed in a variety of orders not illustrated, or even in parallel.

At operation 1302, process 1300 receives supplemental call data for mobile devices that initiated 911 calls, according to an embodiment. The supplemental call data may include a device ID, location data, and timestamp data for each of the 911 calls.

At operation 1304, process 1300 generates call metrics for the 911 calls based on the supplemental call data, according to an embodiment.

At operation 1306, process 1300 receives queries for a portion of the supplemental call data from a PSAP, responsive to receipt of primary call data for the 911 calls at the PSAP from 911 services for the mobile devices, according to an embodiment. The primary call data includes audio data and the device ID for each of the 911 calls.

At operation 1308, process 1300 generates query metrics for the 911 calls based on the queries, according to an embodiment.

At operation 1310, process 1300 detects a loss of the primary call data by a PSAP based on the call metrics and the query metrics to determine a likelihood of a 911 service outage for the PSAP, according to an embodiment.

At operation 1312, process 1300 provides a notification to the PSAP of the likelihood of the 911 service outage, according to an embodiment.

Figure 14:
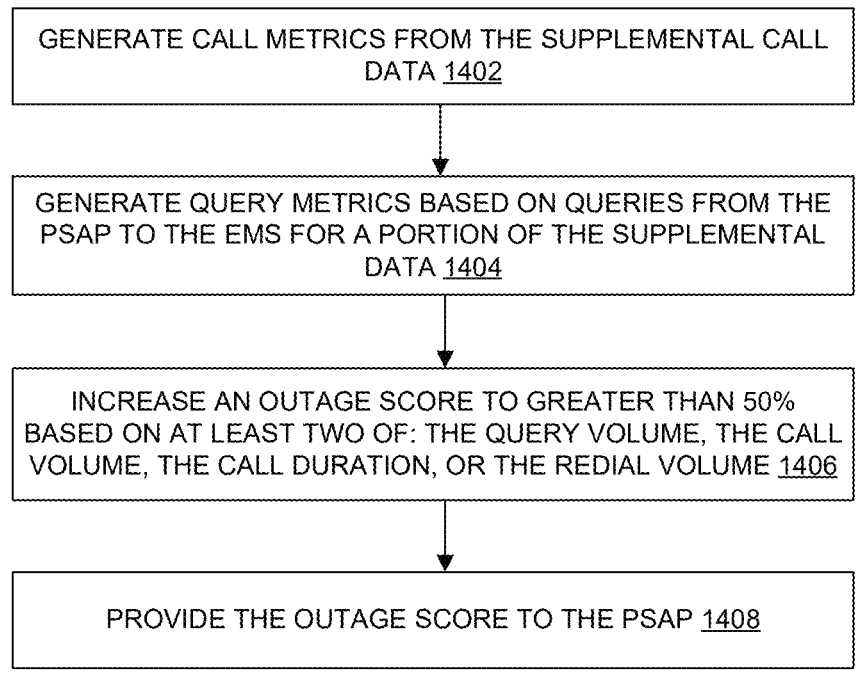
FIG. 14 illustrates a flow diagram of a process for determining a likelihood of a 911 service outage at a PSAP, in accordance with embodiments of the disclosure.

FIG. 14 illustrates a flow diagram of a process 1400 for determining a likelihood of a 911 service outage at a public safety answering point (PSAP), in accordance with aspects of the disclosure. Process 1400 represents an algorithm or set of instructions that may be included in one or more software modules and that may be executed or run by an analytics system and/or an analytics engine of an EMS, according to an embodiment. Process 1400 may include various operation blocks. Process 1400 is an example process that may be performed or incorporated into memory, servers, and/or software modules of an EMS (e.g., EMS 312 and/or EMS 400), as disclosed herein. The order in which some or all of the process operation blocks appear in process 1400 should not be deemed limiting. Rather, one of ordinary skill in the art having the benefit of the present disclosure will understand that some of the process blocks may be executed in a variety of orders not illustrated, or even in parallel.

At operation 1402, process 1400 generates call metrics from the supplemental call data, according to an embodiment. The call metrics include call volume, call duration, and redial volume, according to an embodiment.

At operation 1404, process 1400 generates query metrics based on queries from the PSAP to the EMS for a portion of the supplemental data, according to an embodiment. The query metrics may include query volume. The queries may be LIS HTTP queries, such as HELD (HTTP-Enabled Location Delivery) requests. In response to the queries or requests, the EMS may return XLM schemas per the national emergency number association (NENA) i3 architecture to provide location objects. The location objects may be in the format of PIDF-LOs (presence information data format location objects). The LIS HELD interface is simply a webserver that responds to HTTP requests with XML, according to an embodiment.

At operation 1406, process 1400 increases an outage score to greater than 50% based on at least two of: the query volume, the call volume, the call duration, or the redial volume, according to an embodiment. The outage score represents the likelihood of the 911 service outage at the PSAP, in an embodiment.

At operation 1408, process 1400 provides the outage score to the PSAP, according to an embodiment. The outage score may be provided via email, SMS, or one or more UI elements in an emergency response application, for example.

Figure 15:
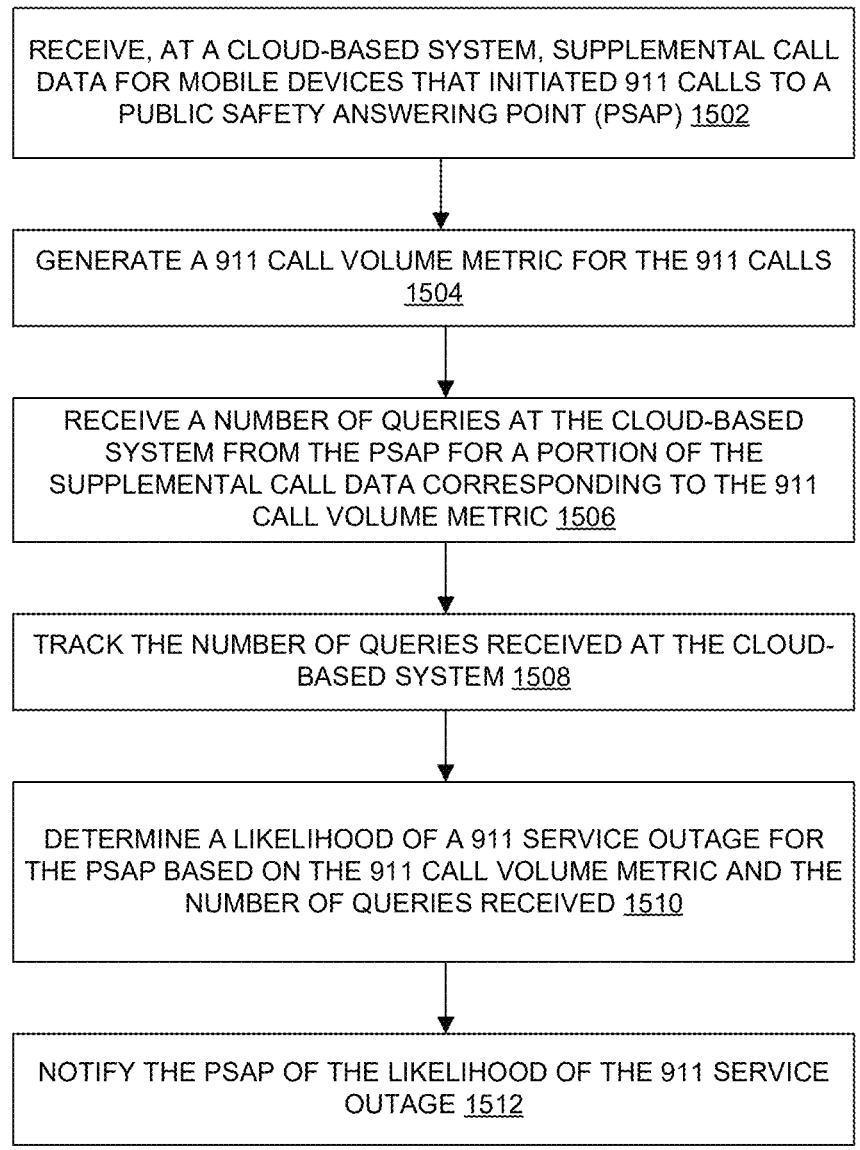
FIG. 15 illustrates a flow diagram of a process for determining a likelihood of a 911 service outage at a PSAP, in accordance with embodiments of the disclosure.

FIG. 15 illustrates a flow diagram of a process 1500 for determining the likelihood of a 911 service outage, in accordance with aspects of the disclosure. Process 1500 represents an algorithm or set of instructions that may be included in one or more software modules and that may be executed or run by an EMS, according to an embodiment. Process 1500 may include various operation blocks. Process 1500 is an example process that may be performed or incorporated into memory, servers, and/or software modules of an EMS (e.g., EMS 312 and/or EMS 400), as disclosed herein. The order in which some or all of the process operation blocks appear in process 1500 should not be deemed limiting. Rather, one of ordinary skill in the art having the benefit of the present disclosure will understand that some of the process blocks may be executed in a variety of orders not illustrated, or even in parallel.

At operation 1502, process 1500 receives, at a cloud-based system, supplemental call data for mobile devices that initiated 911 calls to a public safety answering point (PSAP), according to an embodiment. An EMS is an example of a cloud-based system. The cloud-based system may include a distributed service and may include servers, memory, routers, switches, load balancers, operating systems, virtual machine managers, and virtual machines that are communicatively coupled over one or more networks over one or more locations.

At operation 1504, process 1500 generates a 911 call volume metric for the 911 calls, according to an embodiment.

At operation 1506, process 1500 receives a number of queries at the cloud-based system from the PSAP for a portion of the supplemental call data corresponding to the 911 call volume metric, according to an embodiment.

At operation 1508, process 1500 tracks the number of queries received at the cloud-based system, according to an embodiment.

At operation 1510, process 1500 determines a likelihood of a 911 service outage for the PSAP based on the 911 call volume metric and the number of queries received, according to an embodiment.

At operation 1512, process 1500 notifies the PSAP of the likelihood of the 911 service outage, according to an embodiment.

Figure 16:
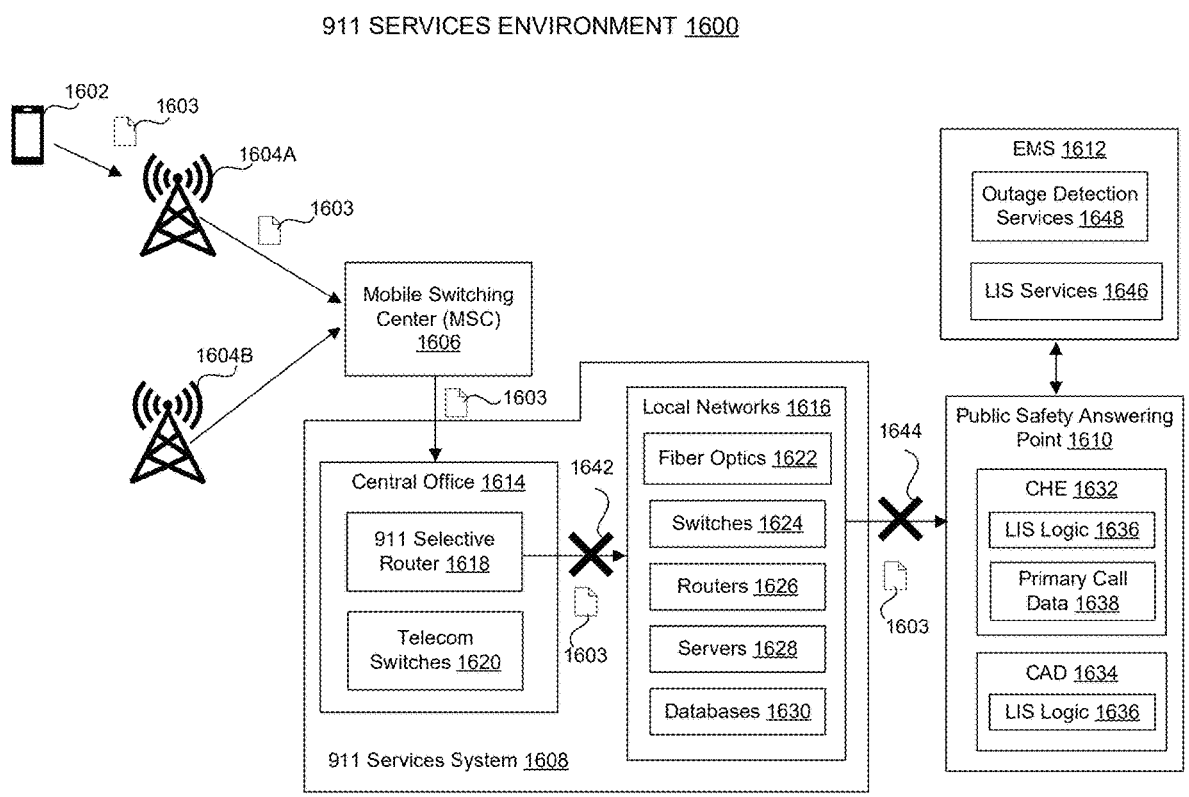
FIG. 16 illustrates a diagram of a 911 services environment, in accordance with embodiments of the disclosure.

FIG. 16 illustrates a diagram of a 911 services environment 1600, in accordance with aspects of the disclosure. 911 services environment 1600 illustrates a general flow of 911 call data that is routed from a mobile device to a PSAP. 911 services environment 1600 includes a mobile device 1602, cell phone towers 1604, a mobile switching center (MSC) 1606, a 911 services system 1608, a PSAP 1610, and an EMS 1612, according to an embodiment.

When mobile device 1602 initiates a 911 call, mobile device 1602 provides 911 call data 1603 to one or more cell phone towers 1604 (e.g., cell phone tower 1604A). Cell phone towers 1604 then provide 911 call data 1603 to MSC 1606. MSC 1606 provides 911 call data 1603 to 911 services system 1608. When 911 services system 1608 is operational, 911 services system 1608 forwards 911 call data 1603 to the ECC or PSAP that is geographically assigned or associated with the one or more cell phone towers 1604 that received 911 call data 1603 from mobile device 1602. PSAP 1610 may receive 911 call data 1603 from 911 service system 1608, when 911 services are operational. EMS 1612 may be communicatively coupled to PSAP 1610 to provide LIS services 1646 and outage detection services 1648, according to embodiments of the disclosure.

911 services system 1608 may include a central office 1614 and local networks 1616 to receive and route 911 call data 1603. A 911 services outage may occur in hardware and/or software at central office 1614, may occur in the transmission of information between central office 1614 to local networks 1616, may occur in local networks 1616, and/or may occur in the transmission of information between local networks 1616 and PSAP 1610. Central office 1614 may include a selective router 1618 and various telecommunications switches 1620. 911 selective router 1618 is a router that is operable to provide 911 call data 1603 to the geographically appropriate local networks 1616 for the 911 call data 1603 to reach the geographically appropriate ECC or PSAP based on the location of cell phone towers 1604. 911 service outage 1642 represents a reduction or blockage of 911 call data flow between central office 1614 and local networks 1616. 901 service outage 1644 represents a reduction or blockage of 911 call data flow between local networks 1616 and PSAP 1610. Local networks 1616 may include, but are not limited to, fiber optics 1622, switches 1624, routers 1626, servers 1628, and/or databases 1630. When one or more components of local networks 1616 fail, are damaged, and/or are otherwise rendered inoperable, PSAP 1610 may experience 911 service outage 1644 (e.g., a failure to receive 911 call data from one or more mobile devices geographically associated with PSAP 1610).

PSAP 1610 may include CHE 1632 and CAD 1634. CHE 1632 may include LIS logic 1636 and primary call data 1638. LIS logic 1636 may be used to request device-based location data from LIS services 1646. Primary call data 1638 may include 911 call data 1603 and primary location data that is retrieved by CHE 1632 or by PSAP 1610 using the device ID of mobile device 1602 and one or more geographic information databases. CAD 1634 may include LIS logic 1636 in addition to or instead of CHE 1632.

EMS 1612 is operable to monitor 911 call data flow between 911 services system 1608 and PSAP 1610, based on LIS queries received by LIS services 1646 and based on supplemental calls data received from mobile devices (e.g., through one or more third-party servers). Advantageously, outage detection services 1648 may provide insights into the frequency, duration, and impact (e.g., number of missed calls) of 911 service outages, in accordance with aspects of the disclosure.

While this disclosure contains many specific implementation details, these should not be construed as limitations on the scope of what may be claimed, but rather as descriptions of features specific to particular implementations. Certain features that are described in this specification in the context of separate implementations may also be implemented in combination in a single implementation. Conversely, various features that are described in the context of a single implementation may also be implemented in multiple implementations separately or in any suitable sub-combination. Moreover, although features may be described above as acting in certain combinations and even initially claimed as such, one or more features from a claimed combination may in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous.

References to "or" may be construed as inclusive so that any terms described using "or" may indicate any of a single, more than one, and all of the described terms. The labels "first," "second," "third," and so forth are not necessarily meant to indicate an ordering and are generally used merely to distinguish between like or similar items or elements.

Various modifications to the implementations described in this disclosure may be readily apparent to those skilled in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein.

The term "logic" and/or "processing logic" in this disclosure may include one or more processors, microprocessors, multi-core processors, application-specific integrated circuits (ASIC), and/or field programmable gate arrays (FPGAs) to execute operations disclosed herein. In some embodiments, memory may be integrated into the logic to store instructions to execute operations and/or store data. Logic may also include analog or digital circuitry to perform the operations in accordance with embodiments of the disclosure.

A "memory" or "memories" described in this disclosure may include one or more volatile or non-volatile memory architectures. The "memory" or "memories" may be removable and non-removable media implemented in any method or technology for storage of information such as computer-readable instructions, data structures, program modules, or other data. Example memory technologies may include RAM, ROM, EEPROM, flash memory, CD-ROM, digital versatile disks (DVD), high-definition multimedia/data storage disks, or other optical storage, magnetic cassettes, magnetic tape, magnetic disk storage or other magnetic storage devices, or any other non-transmission medium that can be used to store information for access by a computing device.

A computing device may include a desktop computer, a laptop computer, a tablet, a phablet, a smartphone, a feature phone, a server computer, or otherwise. A server computer may be located remotely in a data center or be stored locally.

The processes explained above are described in terms of computer software and hardware. The techniques described may constitute machine-executable instructions embodied within a tangible or non-transitory machine (e.g., computer) readable storage medium, that when executed by a machine will cause the machine to perform the operations described. Additionally, the processes may be embodied within hardware, such as an application-specific integrated circuit ("ASIC") or otherwise.

A tangible non-transitory machine-readable storage medium includes any mechanism that provides (i.e., stores) information in a form accessible by a machine (e.g., a computer, network device, personal digital assistant, manufacturing tool, any device with a set of one or more processors, etc.). For example, a machine-readable storage medium includes recordable/non-recordable media (e.g., read only memory (ROM), random access memory (RAM), magnetic disk storage media, optical storage media, flash memory devices, etc.).

The above description of illustrated embodiments of the invention, including what is described in the Abstract, is not intended to be exhaustive or to limit the invention to the precise forms disclosed. While specific embodiments of, and examples for, the invention are described herein for illustrative purposes, various modifications are possible within the scope of the invention, as those skilled in the relevant art will recognize.

These modifications can be made to the invention in light of the above detailed description. The terms used in the following claims should not be construed to limit the invention to the specific embodiments disclosed in the specification. Rather, the scope of the invention is to be determined entirely by the following claims, which are to be construed in accordance with established doctrines of claim interpretation.

The invention claimed is:

1. A method of determining a likelihood of a 911 service outage at a public safety answering point (PSAP), comprising:
   receiving supplemental call data for mobile devices that initiated 911 calls,
   wherein the supplemental call data includes a device ID, location data, and timestamp data for each of the 911 calls;
   generating call metrics for the 911 calls based on the supplemental call data;
   receiving queries for a portion of the supplemental call data from a PSAP, responsive to receipt of primary call data for the 911 calls at the PSAP from 911 services for the mobile devices,
   wherein the primary call data includes audio data and the device ID for each of the 911 calls;
   generating query metrics for the 911 calls based on the queries;
   detecting a loss of the primary call data by a PSAP based on the call metrics and the query metrics over a time period to determine a likelihood of a 911 service outage for the PSAP; and
   providing a notification to the PSAP of the likelihood of the 911 service outage.

2. The method of claim 1, wherein notifying the PSAP includes at least one of:
   emailing the notification to an administrator of the PSAP,
   transmitting the notification to a mobile device number of the administrator of the PSAP,
   or displaying the notification on an emergency response application operated at the PSAP.

3. The method of claim 1, wherein the PSAP is one of a plurality of PSAPs in a state, wherein the method further comprises:
   providing the notification to a director of the plurality of PSAPs in the state.

4. The method of claim 1, wherein the call metrics include call volume, wherein the query metrics include query volume, wherein the likelihood of a 911 service outage is greater than 50% if a rise in call volume is detected with a drop in query volume.

5. The method of claim 1, wherein the call metrics include relative call volume, wherein the relative call volume is a ratio of current call volume to baseline call volume, wherein the query metrics include query volume, wherein the likelihood of a 911 service outage is greater than 50% if a rise in relative call volume is detected with a drop in query volume.

6. The method of claim 1, wherein the query metrics include a query volume, wherein the method further comprises:
increasing the likelihood of the 911 service outage based on the query volume dropping to less than 50% of a baseline query volume for the PSAP at a same time of day, at a same day of a week, or at a same day of a year.

7. The method of claim 1, wherein the call metrics include a call volume, wherein the method further comprises:
increasing the likelihood of the 911 service outage based on a spike in the call volume.

8. The method of claim 1, wherein the call metrics include a call duration, wherein the method further comprises:
increasing the likelihood of the 911 service outage based on decrease in call duration.

9. The method of claim 1, wherein the call metrics include a redial volume, wherein the method further comprises:
increasing the likelihood of the 911 service outage based on increase in the redial volume.

10. The method of claim 1, wherein the PSAP is one of a plurality of PSAPs in a state, wherein the method further comprises:
providing the notification to one or more other ones of the plurality of PSAPs in the state.

11. The method of claim 1, wherein the PSAP includes call handling equipment (CHE), wherein the CHE is operable to receive the primary call data from the 911 services, wherein the 911 services route the 911 calls from mobile switching centers (MSCs) to the CHE, wherein the primary call data includes automatic number identification (ANI) data.

12. The method of claim 1, further comprising:
searching external sources for confidence data that increases or decreases a confidence level of the likelihood of the 911 service outage; and
modifying the likelihood of the 911 service outage based on the confidence data.

13. The method of claim 12, wherein the external sources include at least one of: social media feeds; news feeds; weather feeds; or traffic feeds.

14. The method of claim 1, further comprising:
associating the supplemental call data with the queries in a first data structure;
associating the call metrics with the query metrics in a second data structure; and
populating, with an analytics module, the second data structure with the call metrics and the query metrics.

15. An analytics system, comprising:
a first data structure maintained by an emergency management system (EMS) and operable to receive supplemental call data for mobile devices that initiated 911 calls;
a second data structure maintained by the EMS and operable to store emergency call analytics;
one or more processors of the EMS; and
memory of the EMS, wherein the memory comprises instructions that, when executed by the one or more processors, cause the analytics system to perform a method for determining a likelihood of a 911 service outage at a public safety answering point (PSAP), the method comprising:
generating call metrics from the supplemental call data, wherein the call metrics include call volume, call duration, and redial volume;
generating query metrics based on queries from the PSAP to the EMS for a portion of the supplemental data, wherein the query metrics include query volume;
increasing an outage score to greater than 50% based on at least two of: the query volume, the call volume, the call duration, or the redial volume,
wherein the outage score represents the likelihood of the 911 service outage at the PSAP; and
providing the outage score to the PSAP.

16. The analytics system of claim 15, further comprising:
an analytics module communicatively coupled to the first data structure and the second data structure, the analytics module being operable to generate the emergency call analytics from the supplemental call data.

17. The analytics system of claim 15, wherein the outage score includes at least one of:
a text-based description of the likelihood of the 911 service outage; or
a numerical range from a lowest number to a highest number, wherein the numeric range represents the likelihood of the 911 service outage.

18. The analytics system of claim 15, further comprising:
increasing the outage score to greater than 50% based on a rise in call volume corresponding with a drop in query volume.

19. A method, comprising:
receiving, at a cloud-based system, supplemental call data for mobile devices that initiated 911 calls to a public safety answering point (PSAP);
generating a 911 call volume metric for the 911 calls;
receiving a number of queries at the cloud-based system from the PSAP for a portion of the supplemental call data corresponding to the 911 call volume metric;
tracking the number of queries received at the cloud-based system;
determining a likelihood of a 911 service outage for the PSAP based on the 911 call volume metric and the number of queries received; and
notifying the PSAP of the likelihood of the 911 service outage.

20. The method of claim 19, wherein the supplemental call data include a device identifier (ID), device-based location data, and timestamp data for each of the 911 calls, wherein the queries are location information server (LIS) queries.

21. The method of claim 19, wherein the 911 call volume metric includes call volume, call duration, and redial volume, wherein the likelihood of the 911 service outage for the PSAP is greater than 50% if the call volume increases for a time period and the number of queries decreases for the time period, wherein the time period is at least 3-5 minutes.

22. The method of claim 21, further comprising:
increasing the likelihood of the 911 service outage for the PSAP based on a decrease in an average of call duration for the time period; and
increasing the likelihood of the 911 service outage for the PSAP based on an increase in an average of redial volume for the time period.

23. The method of claim 21, further comprising:
determining a size of the 911 service outage; and
notifying one or more administrators for the PSAP of the size of the 911 service outage.

24. The method of claim 23, wherein the size of the 911 service outage is determined in terms of square miles or quantity of public safety answering points (PSAPs) affected by the 911 service outage.

* * * * *